US009477855B2

(12) United States Patent
Somani et al.

(10) Patent No.: US 9,477,855 B2
(45) Date of Patent: *Oct. 25, 2016

(54) TEST AUTOMATION FOR AUTOMATED FARE MANAGEMENT SYSTEMS

(71) Applicant: Accenture Global Services Limited, Dublin (IE)

(72) Inventors: Avishek Somani, Toronto (CA); Sunil Raina, Issaquah, WA (US); Praveen Dhar, Mississauga (CA)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,036

(22) Filed: Apr. 29, 2016

(65) Prior Publication Data
US 2016/0247005 A1  Aug. 25, 2016

Related U.S. Application Data

(63) Continuation of application No. 14/447,916, filed on Jul. 31, 2014, now Pat. No. 9,330,286.

(51) Int. Cl.
  *G06K 7/10* (2006.01)
  *G06K 7/00* (2006.01)
  *B25J 9/16* (2006.01)
(52) U.S. Cl.
  CPC ............ *G06K 7/0095* (2013.01); *B25J 9/1679* (2013.01); *Y10S 901/02* (2013.01)
(58) Field of Classification Search
  USPC ........................................ 235/384, 482, 375
  See application file for complete search history.

(56) References Cited

U.S. PATENT DOCUMENTS

| 6,719,199 B1 | 4/2004 | Cotton et al. |
| 7,000,836 B2 | 2/2006 | Saeki |
| 9,330,286 B2 | 5/2016 | Somani et al. |
| 2004/0195312 A1 | 10/2004 | Mawatari |
| 2007/0080205 A1 | 4/2007 | You et al. |
| 2008/0091601 A1 | 4/2008 | Green et al. |
| 2010/0168999 A1 | 7/2010 | Horie et al. |
| 2014/0217169 A1 | 8/2014 | Lewis et al. |

OTHER PUBLICATIONS

Extended European Search Report corresponding to EP 15 17 5412, mailed Nov. 4, 2015, 8 pages.
Wikipedia, "Automated fare collection", http://en.wikipedia.org/wiki/Automated_fare_collection, Jun. 25, 2014, 6 pages.
Grupo HDI, "Automated Test with Robotic Arm", http://www.grupohdi.com/eng/index.php?option=com_content&view=article&id=52&Itemid=27, Jul. 1, 2014, 1 page.

*Primary Examiner* — Allyson Trail
(74) *Attorney, Agent, or Firm* — Harrity & Harrity, LLP

(57) ABSTRACT

A test robot may receive a test scenario for testing a fare management system. The test robot may program a fare card to store card information based on the test scenario. The test robot may provide an instruction to an actuator component to cause the actuator component to move the fare card within communicative proximity of a card reader device. The fare card, when moved within communicative proximity of the card reader device, may cause the card reader device to read the stored card information from the fare card and to provide updated card information, based on the stored card information, for storage by the fare card. The test robot may read the updated card information from the fare card. The test robot may provide test result information, based on the updated card information, to a test management device.

20 Claims, 14 Drawing Sheets

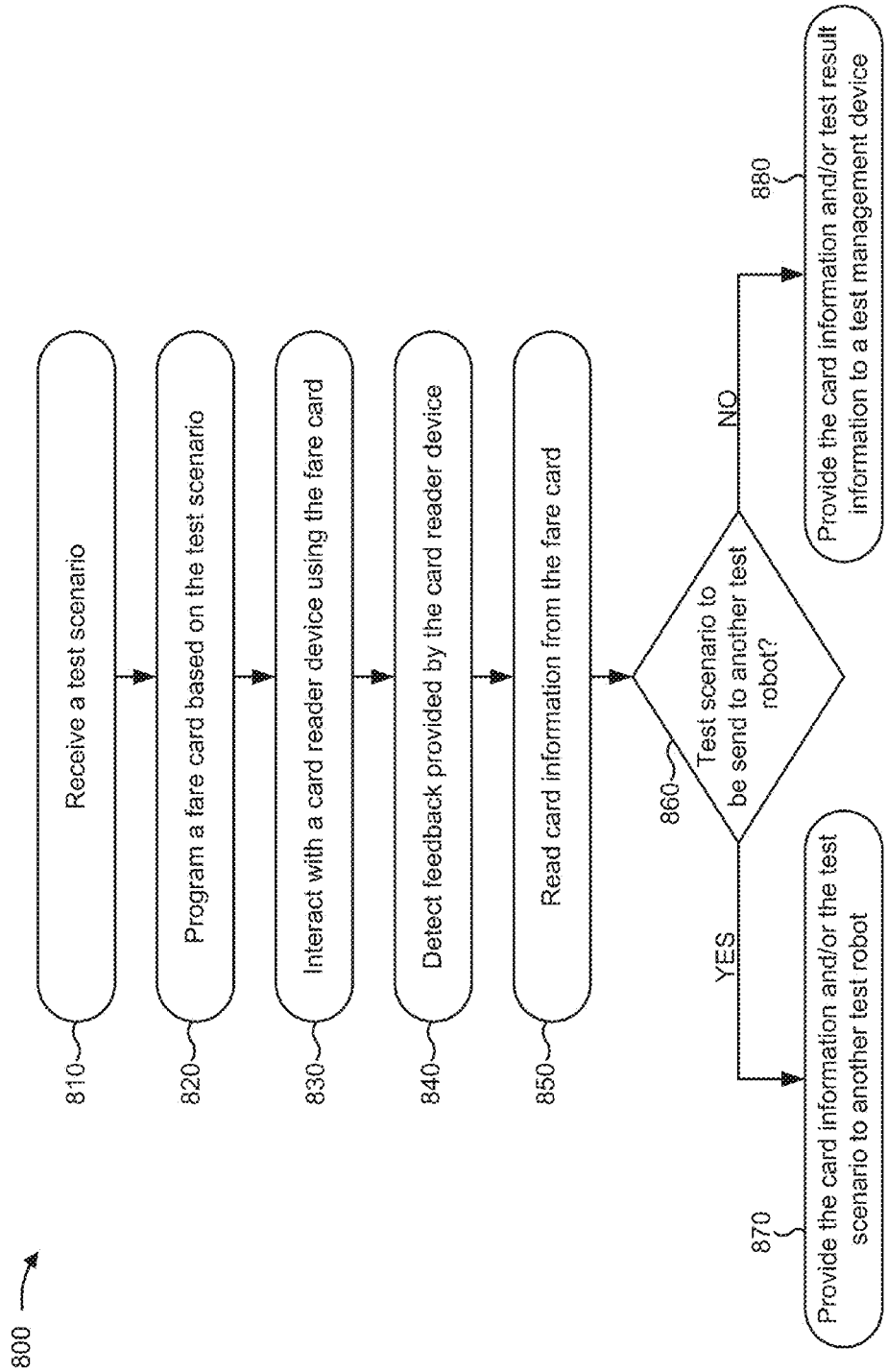

TEST AUTOMATION FOR AUTOMATED FARE MANAGEMENT SYSTEMS

RELATED APPLICATION

This application is a continuation of U.S. patent application Ser. No. 14/447,916, filed Jul. 31, 2014, (now U.S. Pat. No. 9,330,286) which is incorporated herein by reference.

BACKGROUND

An automated fare management system may include a collection of components that automate the ticketing system of a transportation network, such as a public transportation network. For example, an automated fare management system may include fare media, devices to read the media and/or write to the media, servers that act as a back office, or the like.

SUMMARY

According to some possible implementations, a test robot may receive a test scenario for testing a fare management system. The test robot may program a fare card to store card information based on the test scenario. The test robot may provide an instruction to an actuator component to cause the actuator component to move the fare card within communicative proximity of a card reader device. The fare card, when moved within communicative proximity of the card reader device, may cause the card reader device to read the stored card information from the fare card and to provide updated card information, based on the stored card information, for storage by the fare card. The test robot may read the updated card information from the fare card. The test robot may provide test result information, based on the updated card information, to a test management device.

According to some possible implementations, a computer-readable medium may store instructions that, when executed by a processor, cause the processor to receive a test scenario for testing a fare management system. The test scenario may include card information to be stored by a fare card. The instructions may cause the processor to program the fare card, based on the test scenario, to cause the fare card to store the card information. The instructions may cause the processor to instruct an actuator component to move the fare card within communicative proximity of a card reader device. The fare card, when moved within communicative proximity of the card reader device, may cause the card reader device to read the stored card information from the fare card and to provide updated card information, based on the stored card information, for storage by the fare card. The instructions may cause the processor to read the updated card information from the fare card, and to provide the updated card information to another device.

According to some possible implementations, a method may include receiving, by a device, a test scenario for testing a fare management system. The method may include outputting, by the device, a request for a particular test robot type identified by the test scenario. The method may include receiving, by the device and from a first test robot of the particular test robot type, a response to the request. The method may include providing, by the device, the test scenario to the first test robot based on receiving the response. The method may include receiving, by the device, test result information associated with execution of the test scenario by the first test robot. The method may include determining, by the device, whether the test scenario is to be provided to a second test robot for further execution. The method may include selectively causing, by the device, the test scenario to be provided to the second test robot based on determining whether the test scenario is to be provided to the second test robot.

BRIEF DESCRIPTION OF THE DRAWINGS

FIG. 8 is a flow chart of an example process for executing a test scenario;

DETAILED DESCRIPTION

The following detailed description of example implementations refers to the accompanying drawings. The same reference numbers in different drawings may identify the same or similar elements.

An automated fare management system may include different types of card reader devices (e.g., bus card reader devices, station card reader devices, subway card reader devices, point of sale devices, card query devices, fare inspection devices, etc.), and the different types of card reader devices may act differently based on different requirements. Furthermore, different business rules may govern the card reader devices that read from and/or write to fare cards, such as different rules defining how a fare is calculated, a transfer scenario, customer loyalty incentives, discounts, lost or stolen fare cards, sale of fare products (like balance and passes), a manner in which fare cards are read from and/or written to, a human machine interface (HMI) of the card reader device (e.g., when a fare is accepted, when a fare is declined, when fare media is queried, when a fare product is added to the fare media, when a fare media is inspected, etc.), a transaction message formulated by the card reader device, or the like. Before an automated fare management system is deployed or updated, different test scenarios may be tested using fare cards, card reader devices, back office server devices, or the like, to test whether the business rules are properly implemented by the automated fare management system. Such testing may be performed using a manual process that is time-consuming and error prone. Implementations described herein assist in automating the testing of automated fare management systems, which may reduce the amount of time required to perform the tests and may increase the accuracy of test results.

Figure 1:
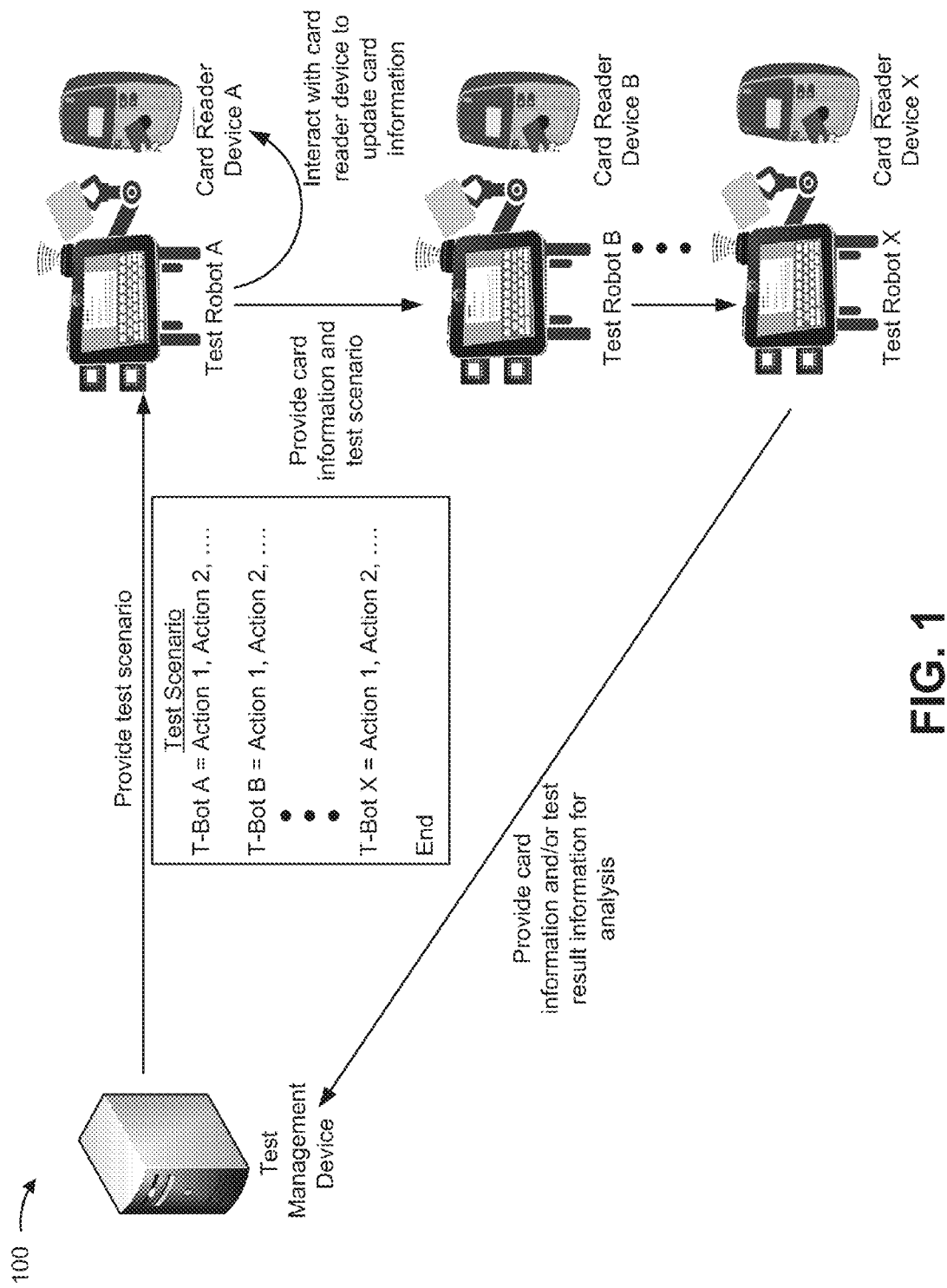
FIG. 1 is a diagram of an overview of an example implementation described herein.

FIG. 1 is a diagram of an overview of an example implementation 100 described herein. As shown in FIG. 1, a test management device (e.g., a server device, a workstation computer, etc.) may provide a test scenario to a first test robot, shown as Test Robot A. As shown, the test scenario may specify particular actions to be performed by Test Robot A and/or other test robots, shown as Test Robot B through Test Robot X. The test scenario may also specify test data to be used for the test scenario, such as card information stored by the fare card, a fare card profile, a card reader device configuration, or the like. Test Robot A may receive the test scenario from the test management device, and may interact with a card reader device (e.g., a device that reads from and/or writes to a fare card), shown as Card Reader Device A, based on the actions specified in the test scenario.

For example, the test robot may use a robotic arm to move a fare card in communicative proximity of the card reader device, which may cause the card reader device to interact with the fare card, such as by computing a fare (e.g., based on fare rules, card information stored by the fare card, a configuration of the card reader device, etc.), checking the fare card for validity (e.g., determining whether the fare card has been reported as lost or stolen, etc.), updating card information stored by the fare card, adding fare products to the fare card, or the like. Test Robot A may read the fare card to ensure that the fare card has been updated with the updated card information by Card Reader Device A. Test Robot A may also identify a transaction message created by the card reader device, and may monitor the transaction message as it flows through different components of a back office server device, validating that the correct action was performed based on the transaction message.

As further shown in FIG. 1, after the fare card has been updated by Card Reader Device A, Test Robot A may provide the updated card information, the test scenario (e.g., including card reader device configuration information, information for subsequent test steps, etc.) and the test scenario to Test Robot B. Test Robot B may interact with another card reader device (e.g., a different card reader device), shown as Card Reader Device B, based on the actions specified in the test scenario. This process may continue until all test robots specified in the test scenario have performed the actions specified in the test scenario.

In this case, assume that Test Robot X is the final test robot specified in the test scenario. Once Test Robot X has performed the actions specified in the test scenario, Test Robot X may provide final card information (e.g., after the fare card has been updated by one or more test robots and/or card reader devices) and/or test result information to the test management device. The test result information may indicate, for example, HMI responses of the various card reader devices, transaction messages generated by the card reader devices, information associated with the flow of the transaction messages through a back office server device, or the like. The test management device and/or Text Robot X may analyze the card information and/or the test result information to determine whether the test scenario was properly executed (e.g., a test scenario for a fare transfer where a passenger transfers from a bus to a subway within a particular time period) and/or whether the test scenario passed, partially passed, failed, etc. Test Robot X and/or the test management device may analyze such information for each step in the test scenario, for a particular step, for a set of steps, or the like. In this way, the test management device may automate testing of various test scenarios associated with an automated fare management system, thereby increasing efficiency and reducing errors associated with the testing.

Figure 2:
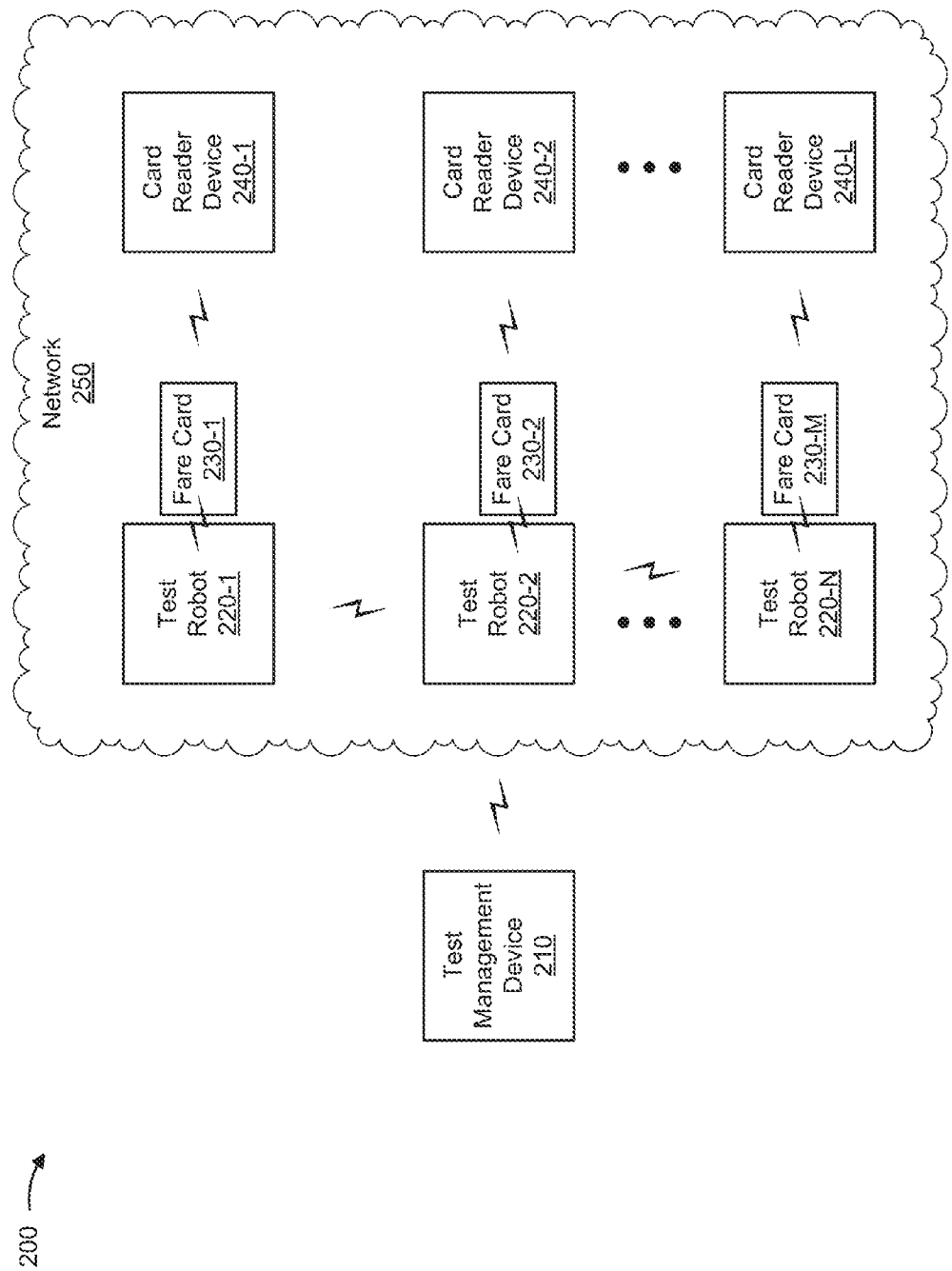
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a test management device 210, a set of test robots 220-1 through 220-N (N≥1) (hereinafter referred to collectively as "test robots 220," and individually as "test robot 220"), a set of fare cards 230-1 through 230-M (M≥1) (hereinafter referred to collectively as "fare cards 230," and individually as "fare card 230"), a set of card reader devices 240-1 through 240-L (L≥1) (hereinafter referred to collectively as "card reader devices 240," and individually as "card reader device 240"), and a network 250. Devices of environment 200 may interconnect via wired connections, wireless connections, or a combination of wired and wireless connections.

Test management device 210 may include one or more devices capable of receiving, generating, storing, processing, analyzing, and/or providing information associated with testing an automated fare management system. For example, test management device 210 may include a computing device, such as a server device, a workstation computer, a desktop computer, a laptop computer, a tablet computer, a mobile phone, a cluster of servers, a portable embedded computer device, a custom processor board, or the like. Test management device 210 may provide a test scenario to a set of test robots 220 and/or a set of card reader devices 240, may manage execution of the test scenario by the set of test robots 220 and/or card reader devices 240, may receive a test result of the execution, and/or may analyze the test result.

Test robot 220 (sometimes referred to herein as a T-Bot) may include one or more devices capable of receiving, generating, storing, processing, analyzing, and/or providing information associated with testing an automated fare management system. For example, test robot 220 may include a robot. In some implementations, test robot 220 may include, for example, a processor for processing instructions (e.g., for executing a test scenario), a fare card reader to read card information from fare card 230, a fare card writer to write information to fare card 230, one or more actuators to move fare card 230 into a communicative proximity of card reader device 240 (e.g., an actuator arm, a robotic arm, a piston, a motor, etc.), one or more sensors to detect feedback from card reader device 240 (e.g., a light sensor, an audio sensor, a haptic sensor, an image processing component, a microphone, etc.), a display component to display information (e.g., card information), a communication interface (e.g., Wi-Fi, Bluetooth, Ethernet, etc.) to communicate with other devices (e.g., test management device 210, card reader device 240, a back office server device, etc.), or the like. Test robot 220 may receive a test scenario from test management device 210 and/or from another test robot 220, may execute the test scenario (e.g., by interacting with fare card 230 and/or card reader device 240), and may provide a result of executing the test scenario (e.g., card information or other information) to test management device 210 and/or another test robot 220.

Fare card 230 may include one or more devices capable of receiving, storing, and/or providing card information associated with an automated fare management system. For example, fare card 230 may include a smart card (e.g., a contact smart card, a contactless smart card, a reloadable smart card, a reprogrammable smart card, etc.), a chip card, an integrated circuit card, an identification card, a proximity card, an access card, a contactless card, a radio-frequency identification (RFID) card, a magnetic stripe fare card, a limited use media, a mobile device (e.g., executing a fare card application, such as a mobile wallet), a sensor, a near-field communication device, a Bluetooth tag, a Bluetooth low energy tag, a Bluetooth 4.0 device, a sensor sticker, a wearable device, a wireless key fob, or the like. Fare card 230 may store card information, such as a card balance stored by fare card 230 or a credential stored by fare card 230 (e.g., a credential used to access a card balance via a back office server device). Test robot 220 and/or card reader device 240 may interact with fare card 230 to read and/or write the card information stored by fare card 230.

Card reader device 240 may include one or more devices capable of reading card information from fare card 230 and/or writing card information to fare card 230. For example, card reader device 240 may include a contactless smart card reader, a fare card terminal, a fare card vending machine, a fare box, a ticket machine, a station device (e.g., that interacts with a turnstile), a turnstile, a card reader, a card writer, a card query device (e.g., used to check a card balance), a kiosk (e.g., a self-service kiosk), an inspection device (e.g., used to check whether a passenger paid a fare), a point-of-sale device, a fare transaction processor, a mobile device (e.g., a phone, a tablet, etc.), a handheld inspection device, or the like. Card reader device 240 may be configured to read card information from fare card 230 in communicative proximity (e.g., a particular range, such as a few inches, one hundred feet, etc.) of card reader device 240, to process the card information to determine updated card information to be provided to fare card 230, and to provide the updated card information to fare card 230 for storage.

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), a personal area network (e.g., a Bluetooth network, a Bluetooth low energy network, etc.), a private network, an ad hoc network, an intranet, the Internet, a fiber optic-based network, a cloud computing network, a Bluetooth network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
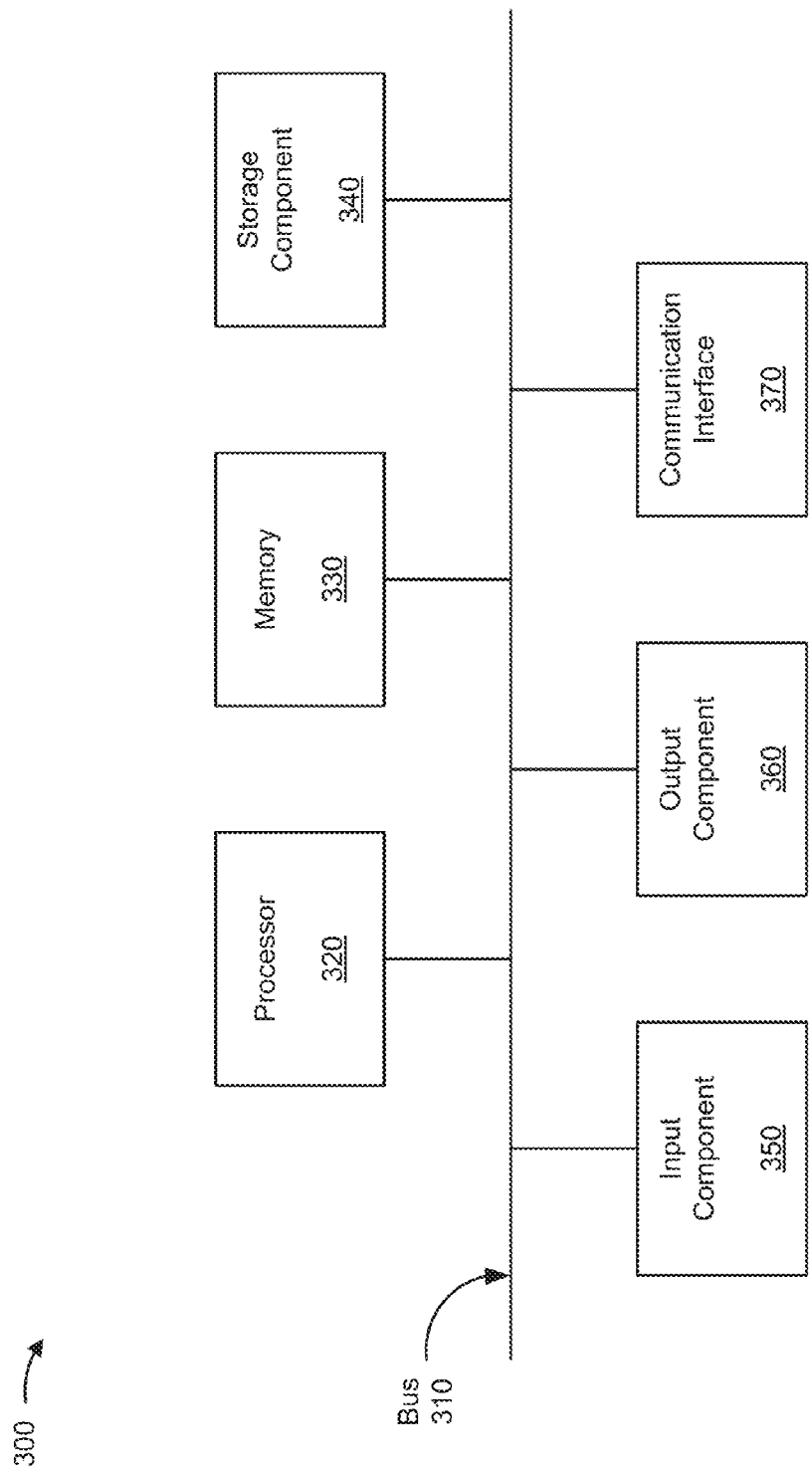
FIG. 3 is a diagram of example components of one or more devices of FIG. 2.

FIG. 3 is a diagram of example components of a device 300. Device 300 may correspond to test management device 210, test robot 220, fare card 230, and/or card reader device 240. In some implementations, test management device 210, test robot 220, fare card 230, and/or card reader device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, a Bluetooth interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
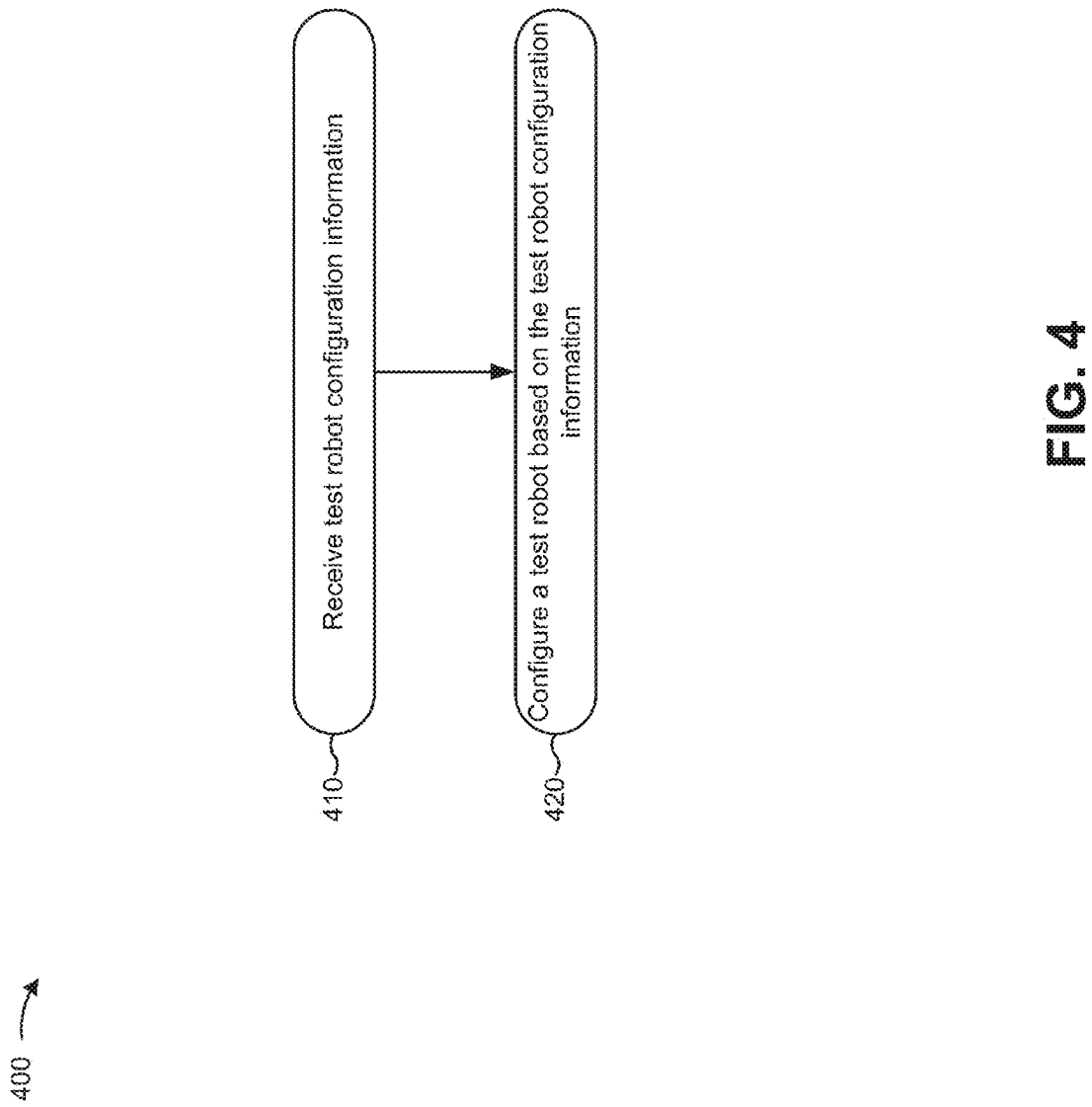
FIG. 4 is a flow chart of an example process for configuring a test robot based on test robot configuration information.

FIG. 4 is a flow chart of an example process 400 for configuring a test robot based on test robot configuration information. In some implementations, one or more process blocks of FIG. 4 may be performed by test robot 220. In some implementations, one or more process blocks of FIG. 4 may be performed by another device or a group of devices separate from or including test robot 220, such as test management device 210, fare card 230, and/or card reader device 240.

As shown in FIG. 4, process 400 may include receiving test robot configuration information (block 410). For example, test robot 220 may receive test robot configuration information. In some implementations, test robot 220 may receive the test robot configuration information based on user interaction with test robot 220 (e.g., user interaction with a display of test robot 220, with input components of test robot 220, etc.). Additionally, or alternatively, test robot 220 may receive the test robot configuration from another device, such as test management device 210. For example, a user may interact with test management device 210 to provide the test robot configuration information (e.g., via an input component and/or a communication interface of test management device 210), and test management device 210 may provide the test robot configuration information to test robot 220 (e.g., via network 250).

Test robot configuration information may include, for example, information that identifies a test robot type to which test robot 220 is to be configured. A test robot type may include, for example, a bus test robot (e.g., a test robot 220 that interacts with a card reader device 240 programmed to manage bus fares), a train test robot (e.g., a test robot 220 that interacts with a card reader device 240 programmed to manage train fares), a subway test robot (e.g., a test robot 220 that interacts with a card reader device 240 programmed to manage subway fares), a self-service kiosk, a point-of-sale device, or the like. Test robot configuration information may permit a single test robot 220 to act as more than one type of test robot 220, in some implementations.

A test robot type may be associated with one or more configuration parameters, which may be included in the test robot configuration information. In some implementations, a configuration parameter may specify a name for identifying test robot 220 (e.g., Test Robot A, Bus Test Robot 1, Train Test Robot C, etc.). Additionally, or alternatively, a configuration parameter may specify a manner in which test robot 220 is to move a robotic arm to bring fare card 230 into communicative proximity of card reader device 240, since different card reader devices 230 may be positioned in different locations relative to test robot 220 (e.g., card reader device 240 may be positioned on top of a turnstile, on the side of a turnstile, facing upward, facing outward toward test robot 220, etc.).

Additionally, or alternatively, a configuration parameter may specify a manner in which test robot 220 is to monitor feedback from card reader device 240 (e.g., after fare card 230 is brought within communicative proximity of card reader device 240). For example, once fare card 230 is brought within communicate proximity of card reader device 240, card reader device 240 may provide haptic feedback (e.g., may open a turnstile, may prevent a turnstile from opening, may open a door, may prevent a door from opening, etc.), may emit audible feedback (e.g., a beep, a voice instruction, etc.), may emit visual feedback (e.g., a green light to indicate a successful interaction with fare card 230, a red light to indicate a failed interaction with fare card 230, a message displayed on a digital display, etc.), may transmit a communication (e.g., a near-field communication), or the like. Test robot 220 may monitor one or more such feedback in a manner indicated by a configuration parameter.

As further shown in FIG. 4, process 400 may include configuring a test robot based on the test robot configuration information (block 420). For example, test robot 220 may receive the test robot configuration information, and may configure itself based on the test robot configuration information (e.g., one or more configuration parameters). This configuration may control a manner in which test robot 220 interacts with fare card 230 and/or card reader device 240 when test robot 220 executes a test scenario.

In some implementations, test management device 210 may configure a set of test robots 220 by providing test robot configuration information to the set of test robots 220. In this case, test management device 210 may determine a network address associated with each test robot 220 in the set of test robots 220 (e.g., an internet protocol (IP) address, a media access control (MAC) address), and may provide respective test robot configuration information to each test robot 220 using the network address. In this way, test robots 220 may be configured locally (e.g., by direct interaction between a user and test robot 220), or may be configured remotely (e.g., by user interaction with test management device 210, which may provide test robot configuration information to test robot 220).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
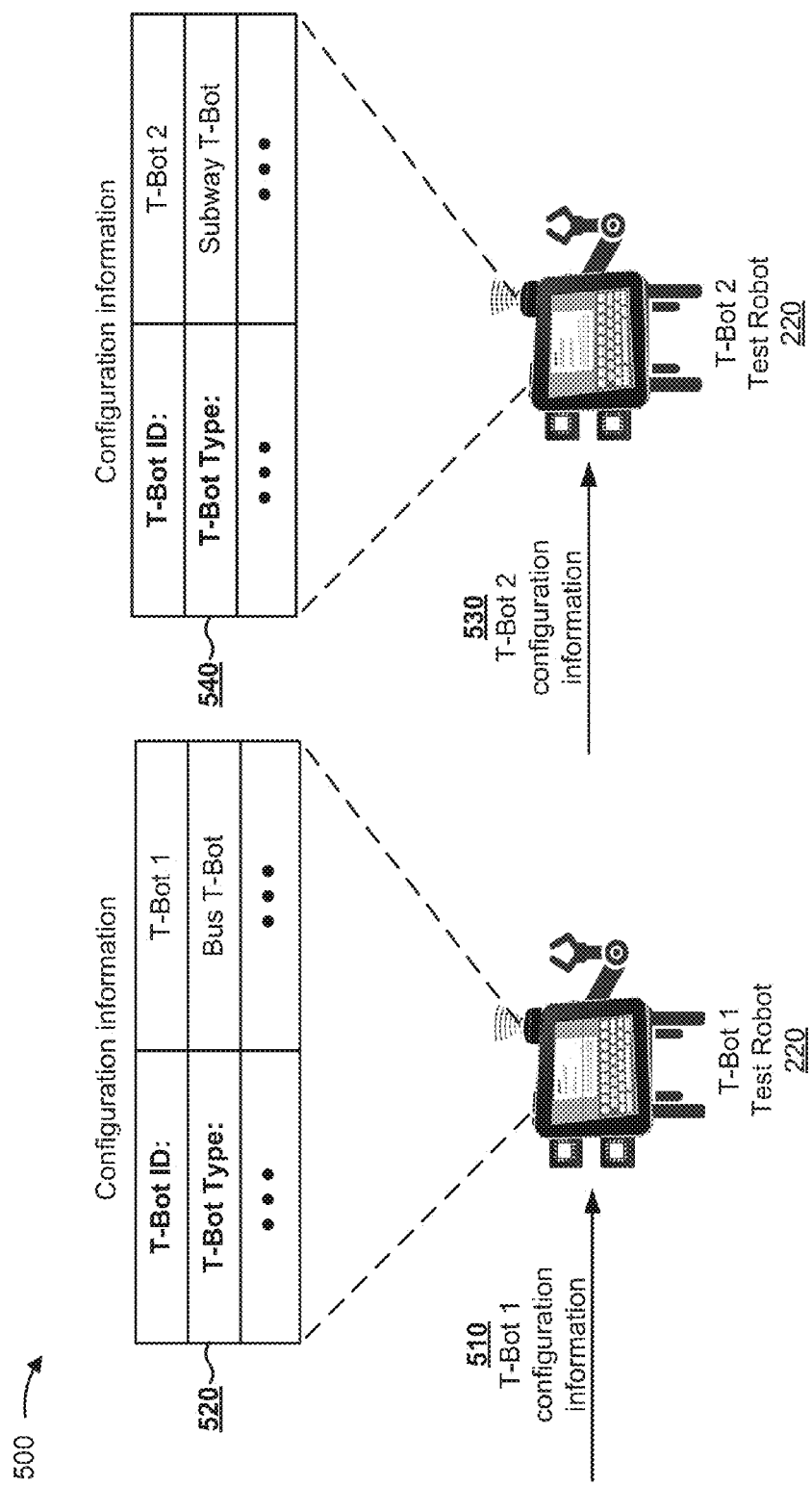
FIG. 5 is a diagram of an example implementation relating to the example process shown in FIG. 4.

FIG. 5 is a diagram of an example implementation 500 relating to example process 400 shown in FIG. 4. FIG. 5 shows an example of configuring a test robot based on test robot configuration information.

As shown in FIG. 5, and by reference number 510, assume that test robot 220, shown as T-Bot 1, receives test robot configuration information. For example, assume that a user interacts with test management device 210 to input the test robot configuration information, and that test management device 210 provides the test robot configuration information to T-Bot 1. As shown by reference number 520, assume that the test robot configuration information specifies that T-Bot 1 is to be configured as a bus T-Bot. Further, assume that the test robot configuration information specifies a manner in which T-Bot 1 is to interact with card reader device 240 (e.g., a card reader device 240 that collects bus fares). Finally, assume that T-Bot 1 configures itself using the test robot configuration information.

As shown by reference number 530, assume that another test robot 220, shown as T-Bot 2, receives test robot configuration information. For example, assume that a user interacts with test management device 210 to input the test robot configuration information, and that test management device 210 provides the test robot configuration information to T-Bot 2. Additionally, or alternatively, test management device 210 may automatically configure T-Bot 1 and/or T-Bot 2 based on a test scenario. As shown by reference number 540, assume that the test robot configuration information specifies that T-Bot 2 is to be configured as a subway T-Bot. Further, assume that the test robot configuration information specifies a manner in which T-Bot 2 is to interact with card reader device 240 (e.g., a card reader device 240 that collects subway fares). Finally, assume that T-Bot 2 configures itself using the test robot configuration information. In this way, different test robots 220 may be configured in a different manner. Furthermore, if a particular type of test robot 220 is needed for a test scenario but is unavailable, test management device 210 may transmit configuration information to an available test robot 220 to convert the available test robot 220 to the needed test robot type.

As indicated above, FIG. 5 is provided merely as an example. Other examples are possible and may differ from what was described with regard to FIG. 5.

Figure 6:
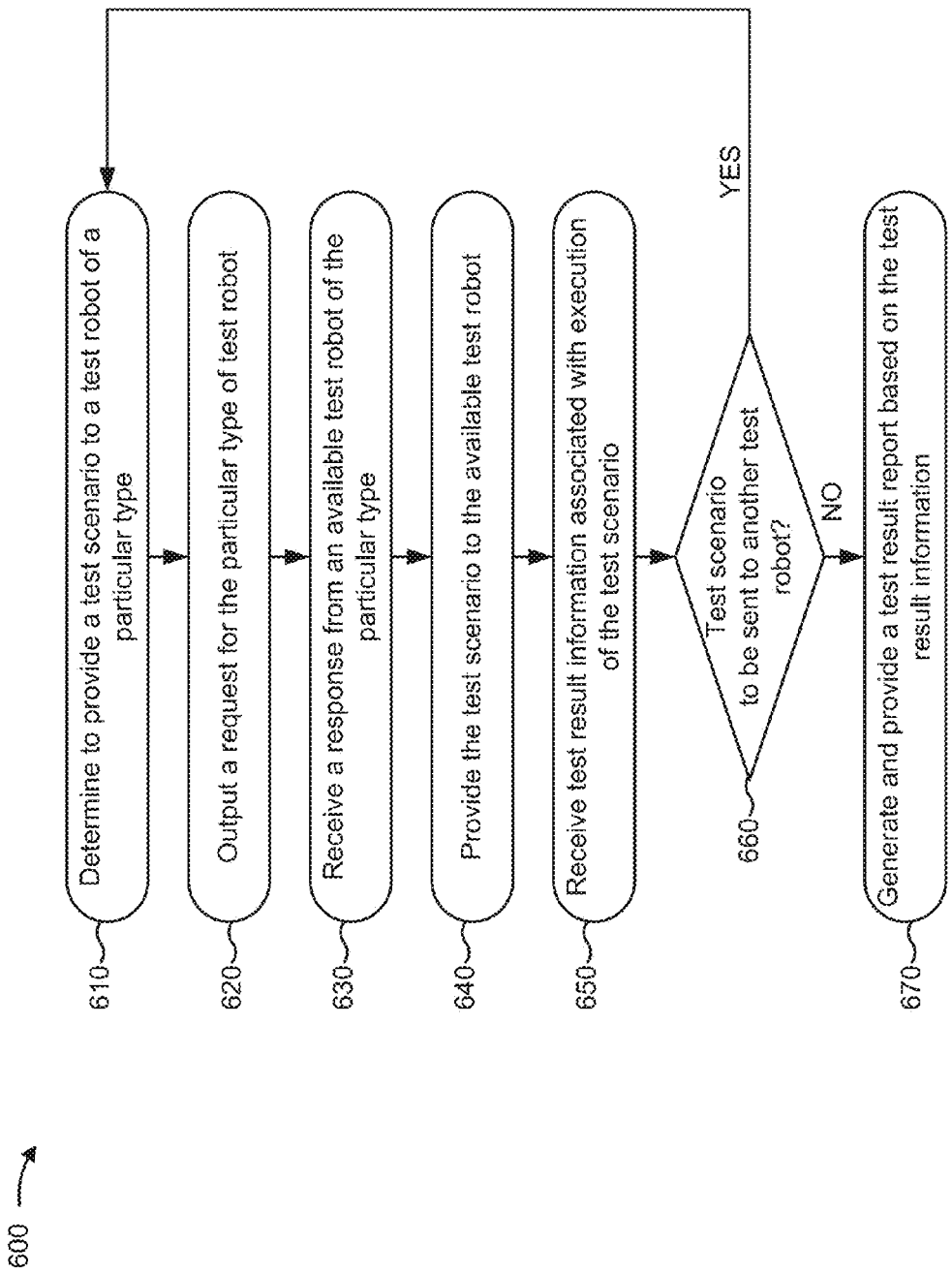
FIG. 6 is a flow chart of an example process for providing a test scenario to one or more test robots, and generating a test result report based on a result of executing the test scenario.

FIG. 6 is a flow chart of an example process 600 for providing a test scenario to one or more test robots, and generating a test result report based on a result of executing the test scenario. In some implementations, one or more process blocks of FIG. 6 may be performed by test management device 210. In some implementations, one or more process blocks of FIG. 6 may be performed by another device or a group of devices separate from or including test management device 210, such as test robot 220, fare card 230, and/or card reader device 240.

As shown in FIG. 6, process 600 may include determining to provide a test scenario to a test robot of a particular type (block 610). For example, test management device 210 may receive input (e.g., from a user and/or another device) instructing test management device 210 to provide a test scenario to test robot 220 of a particular test robot type (e.g., a bus test robot 220, a train test robot 220, a subway test robot 220, a vending machine test robot 220, etc.).

In some implementations, test management device 210 may receive a test scenario based on user input and/or input received from another device. A test scenario may include information that identifies a sequence of steps to be performed by one or more test robots 220 to test an automated fare management system, test data for one or more steps (e.g., card information), an expected test result of one or more steps, criteria for beginning or ending a step, or the like. For example, the test scenario may include information that identifies one or more types of test robots 220 to execute the test scenario, an order in which multiple test robots 220 are to execute the test scenario, one or more actions to be performed by each test robot 220 to execute the test scenario, card information to be read from and/or written to fare card 230 by one or more test robots 220, feedback from card reader device(s) 240 to be monitored by test robot(s) 220, etc.

As further shown in FIG. 6, process 600 may include outputting a request for the particular type of test robot (block 620), and receiving a response from an available test robot of the particular type (block 630). For example, test management device 210 may output a request (e.g., via a broadcast, a multicast, a unicast, etc.), via network 250, for the particular type of test robot 220. The request may indicate a requested test robot type, and multiple test robots 220 (e.g., in communication with network 250) may receive the request. The requested test robot type may be a type of the first test robot 220 in a series of test robots 220 identified in the test scenario as being required to execute the test scenario, in some implementations.

When test robot 220 receives the request, test robot 220 may compare the requested test robot type to the type of test robot 220 to determine whether test robot 220 is of the requested test robot type. If test robot 220 is not of the requested test robot type, then test robot 220 may not respond to the request. Additionally, or alternatively, if test robot 220 is not available (e.g., is currently executing a test scenario, has been allocated to execute a test scenario, etc.), then test robot 220 may not respond to the request. If, however, test robot 220 is of the requested test robot type, and test robot 220 is available (e.g., is not currently executing a test scenario, has not been allocated to execute a test scenario, etc.), then test robot 220 may respond to the request, and may indicate that test robot 220 is available to receive the test scenario.

Additionally, or alternatively, a test may be scheduled for a particular time. In this case, the request may identify a start time for test execution, a duration of test execution, or the like. Test robot 220 may check a schedule to determine whether test robot 220 will be available at the scheduled time, and may respond to the request based on this information. For example, test robot 220 may indicate that test robot 220 will be available at the scheduled time, may indicate an earliest available time that test robot 220 is available (e.g., if test robot 220 is not available during the scheduled time), or the like. In some implementations, test management device 210 may analyze multiple responses, that identify available schedules from different test robots 220, and may determine which test robot(s) 220 to be assigned the test scenario based on the available schedules.

In some implementations, if test management device 210 does not receive a response within a particular amount of time (e.g., a threshold time period), then test management device 210 may re-output the request (e.g., after a threshold amount of time has elapsed). In this way, a particular test robot 220 that was unavailable when the original request was output may respond to the re-output request if the particular test robot 220 becomes available before the re-output request is received.

As further shown in FIG. 6, process 600 may include providing the test scenario to the available test robot (block 640). For example, test management device 210 may receive a response that indicates that a particular test robot 220, of the requested test robot type, is available to receive the test scenario. In this case, test management device 210 may provide the test scenario to the particular test robot 220. In some implementations, test management device 210 may receive a response from multiple test robots 220, indicating that the multiple test robots 220 are available to receive the test scenario. In this case, test management device 210 may select a test robot 220, from the multiple test robots 220, to be provided with the test scenario, and may provide the test scenario to the selected test robot 220. In some implementations, test management device 210 may select a test robot 220 based on capability information associated with the multiple test robots 220 (e.g., a processing speed, a test robot version, a feedback monitoring capability, etc.).

In some implementations, test robot 220 and/or card reader device 240 may experience a failure (e.g., a hardware failure, a software failure, an operating system failure, etc.). For example, test robot 220 and/or card reader device 240 may experience a failure during execution of the test scenario. In this case, test robot 220 may notify test management device 210 of the failure, and test management device 210 may identify another test robot 220 to be assigned the test scenario.

As further shown in FIG. 6, process 600 may include receiving test result information associated with execution of the test scenario (block 650). For example, test management device 210 may provide the test scenario to test robot 220, and one or more test robots 220 may execute the test scenario, as described in more detail in connection with FIG. 8. Test robot(s) 220 may generate test result information based on executing the test scenario, and may provide the test result information to test management device 210.

Test result information may include, for example, information associated with execution of one or more steps of the test scenario (e.g., a particular step, a set of steps, all steps, etc.). In some implementations, test result information may include card information and/or updated card information stored by fare card 230. For example, test robot 220 may program fare card 230 to store card information based on the test scenario. Test robot 220 may then use fare card 230 to interact with card reader device 240, and card reader device 240 may update card information stored by fare card 230. Test robot 220 may read the updated card information, and may provide the updated card information, as test result information, to test management device 210.

Additionally, or alternatively, test result information may include monitored feedback information (e.g., test observations) determined by test robot 220 based on monitoring feedback provided by card reader device 240. For example, when test robot 220 uses fare card 230 to interact with card reader device 240, card reader device 240 may provide feedback to indicate whether the interaction was successful (e.g., whether card reader device 240 was able to read from and/or write to fare card 230). As described elsewhere herein, the feedback may include, for example, haptic feedback (e.g. vibrations), feedback to connected devices (e.g., opening a turnstile), visual feedback (e.g., emitting a light, changing a displayed message or graphic, etc.), audible feedback (e.g., emitting a sound, playing a success tone, playing an audio file, etc.), or the like. Test robot 220 may monitor the feedback, and may record monitored feedback information based on monitoring the feedback. The monitored feedback information may indicate feedback that was detected (e.g., a green light was detected, turnstile movement was detected, a beep was detected, etc.), feedback that was not detected (e.g., a green light was not detected, turnstile movement was not detected, a beep was not detected, etc.), or the like. Test robot 220 may provide the monitored feedback information, as test result information, to test management device 210. Additionally, or alternatively, Test robot 220 may compare the monitored feedback information with expected feedback information for a test step (e.g., expected feedback information identified in the test scenario) to determine a test result (e.g., whether a test step was successfully executed when the monitored feedback information matches the expected feedback information).

Additionally, or alternatively, test result information may include an indication of whether test robot 220 was able to successfully read from and/or write to fare card 230, may include an indication of whether test robot 220 was able to successfully transmit a test scenario and/or card information to another test robot 220, may include time information associated with execution of the test scenario (e.g., a timestamp that indicates when test robot 220 received the test scenario, when test robot 220 read from and/or wrote to fare card 230, when test robot 220 interacted with card reader device 240, when test robot 220 detected feedback from card reader device 240, a duration of the feedback from card reader device 240 detected by test robot 220, when test robot 220 transmitted the test scenario to another test robot 220, when test robot 220 provided test result information, etc.), or the like.

As further shown in FIG. 6, process 600 may include determining whether the test scenario is to be sent to another test robot (block 660). For example, test management device 210 may receive test result information from a test robot 220, indicating that test robot 220 has finished executing the test scenario (e.g., or a portion of the test scenario assigned to test robot 220). Test management device 210 may determine, based on the test scenario, whether the test scenario is to be sent to another test robot 220 (e.g., for execution of another portion of the test scenario). Test management device 210 may make this determination based on whether a test robot 220, from which the test result information was received, is identified as a final test robot 220 in a series of test robots for executing a test scenario.

As an example, assume that a test scenario is associated with three test robots 220. When test management device 210 receives test result information from a first test robot 220, test management device 210 may determine that the test scenario is to be sent to another test robot (e.g., a second test robot 220). Likewise, when test management device 210 receives test result information from the second test robot 220, test management device 210 may determine that the test scenario is to be sent to another test robot (e.g., a third test robot 220). However, when test management device 210 receives test result information from the third test robot 220, test management device 210 may determine that the test scenario is not to be sent to another test robot (e.g., the third test robot 220 is the last test robot 220 in a series of test robots 220, identified in the test scenario, for execution of the test scenario).

In some implementations, test management device 210 may receive an indication after each test robot 220, in a series of test robots 220 identified by the test scenario, finishes execution of an assigned portion of the test scenario. In this case, test management device 210 may determine whether the test scenario is to be sent to another test robot 220 (e.g., based on the test scenario). Additionally, or alternatively, each test robot 220 may read the test scenario (e.g., after test robot 220 finishes execution of the test scenario), and may determine whether the test scenario is to be sent to another test robot 220.

As further shown in FIG. 6, if the test scenario is to be sent to another test robot (block 660—YES), then process 600 may include returning to block 610. For example, if test management device 210 determines that the test scenario is to be sent to another test robot 220, then test management device 210 may determine a test robot type of the other test robot 220, may output a request for the test robot type, may receive a response from an available test robot 220 of the test robot type, may provide the test scenario to the available test robot 220, may receive test result information from the available test robot 220, and may determine whether the test scenario is to be sent to yet another test robot 220. Additionally, or alternatively, test management device 210 may provide execution information, such as updated card information received from a previous test robot 220, to the other test robot 220. Additionally, or alternatively, test robot 220 may determine whether the test scenario is to be sent to yet another test robot 220, then test robot 220 may determine a test robot type of the other test robot 220, may output a request for the test robot type, may receive a response from an available test robot 220 of the test robot type, may provide the test scenario and/or test data (including the updated card information) to the available test robot 220, and the available test robot 220, after execution of its part of the test scenario, may determine whether the test scenario is to be sent to yet another test robot 220.

In some implementations, test management device 210 may receive an indication after each test robot 220, in a series of test robots 220 identified by the test scenario, finishes execution of an assigned portion of the test scenario. In this case, test management device 210 may provide the test scenario, and execution information required to execute the test scenario (e.g., updated card information received from a previous test robot 220), to a next test robot 220 in the series of test robots 220. Additionally, or alternatively, each test robot 220 may read the test scenario (e.g., after test robot 220 finishes execution of the test scenario) to determine a next test robot 220, and may provide the test scenario and the execution information to the next test robot 220. In some implementations, test management device 210 and/or test robot 220 may wait a particular amount of time (e.g., identified in the test scenario) to provide information to another test robot 220, such as when testing the test scenario involves the passage of time.

In some implementations, test robot 220 may request information identifying next test robot 220 from test management device 210. Test management device 210 may determine next test robot 220 (e.g., based on determining a test robot type of next test robot 220, outputting a request, and receiving a response, as described elsewhere herein). Test management device 210 may provide a device identifier for next test robot 220 (e.g., a network address, a device name, etc.) to test robot 220, and test robot 220 may provide test result information and/or card information to next test robot 220 using the device identifier. In some implementations, test robot 220 may request information from available test robots 220 of a particular test robot type. The available test robots 220 that match the particular test robot type may respond to test robot 220. Test robot 220 may then select a next test robot 220 from the available test robots 220 that responded, and may assign the test scenario the next test robot 220 for further execution.

As further shown in FIG. 6, if the test scenario is not to be sent to another test robot (block 660—NO), then process 600 may include generating and providing a test result report based on the test result information (block 670). For example, if test management device 210 determines that the test scenario is not to be sent to another test robot 220, then test management device 210 may generate and provide a test result report based on the test result information. In some implementations, the test result report may include the test result information. Additionally, or alternatively, test management device 210 may analyze the test result information (e.g., by comparing the test result information to a set of criteria) to determine whether the test scenario was successfully executed. Test management device 210 may provide an indication, in the test result report, of whether the test scenario was successfully executed. Test management device 210 may store the test result report, and/or may provide the test result report (e.g., for display, to another device, etc.).

In some implementations, test management device 210 may receive an indication after each test robot 220, in a series of test robots 220 identified by the test scenario, finishes execution of an assigned portion of the test scenario. In this case, test management device 210 may determine that a final test robot 220 has executed the scenario, and may generate and provide the test result report based on this determination. Additionally, or alternatively, a particular test robot 220 may read the test scenario to determine that the particular test robot 220 is a final test robot 220. In this case, the particular test robot 220 may provide an indication, to test management device 210, that the final test robot 220 has executed the test scenario. Test management device 210 may generate and provide the report based on receiving this indication.

In this way, test management device 210 may manage execution of a test scenario by one or more test robots 220, and may provide a test result report that indicates a result of the execution. Additionally, or alternatively, test management device 210 may consolidate the test results from multiple such test scenarios, involving one or many test robots 220, to generate a consolidated test result report. A user may use the test result report to determine whether an automated fare management system is operating properly.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
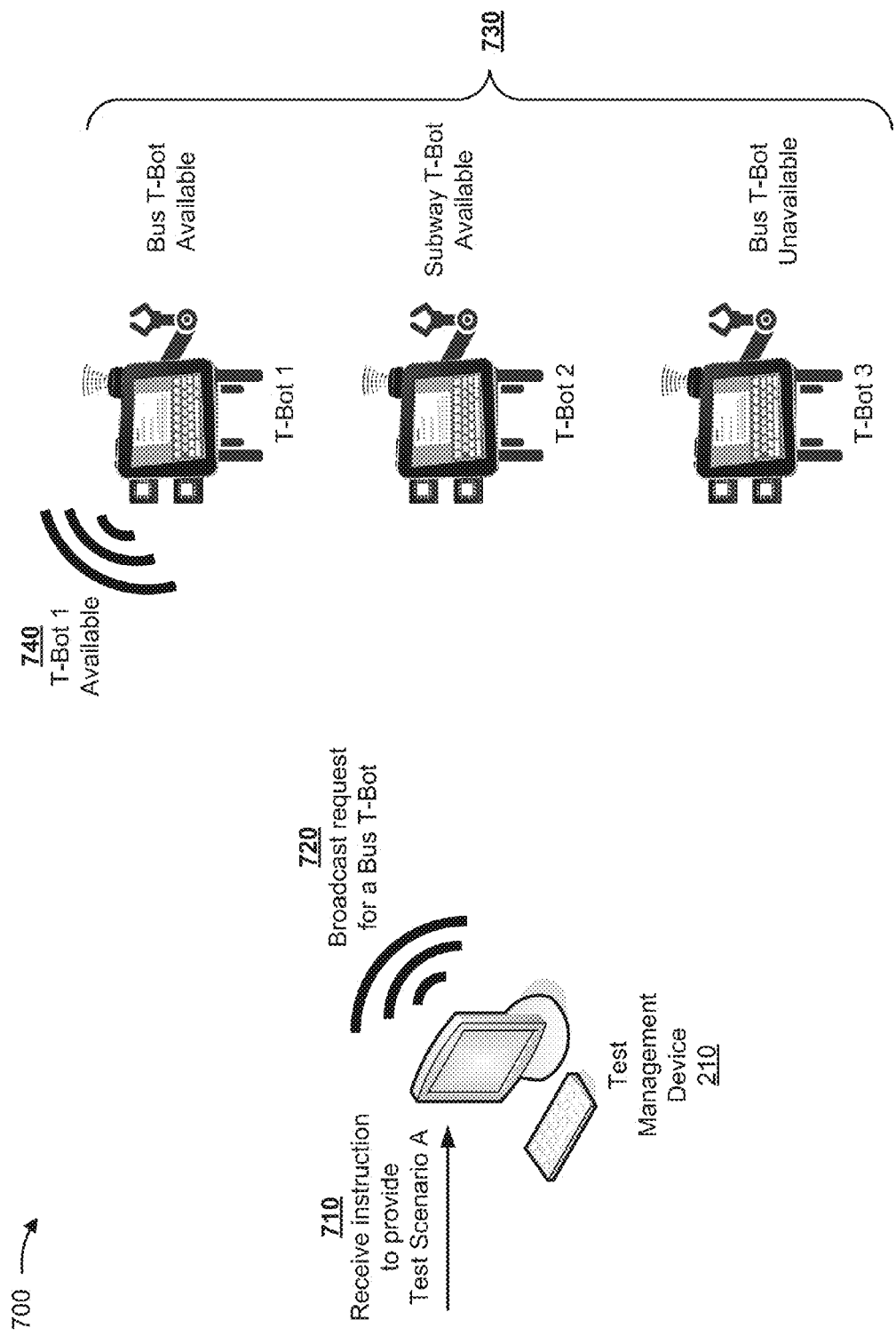
FIGS. 7A and 7B are diagrams of an example implementation relating to the example process shown in FIG. 6.
Figure 7B:
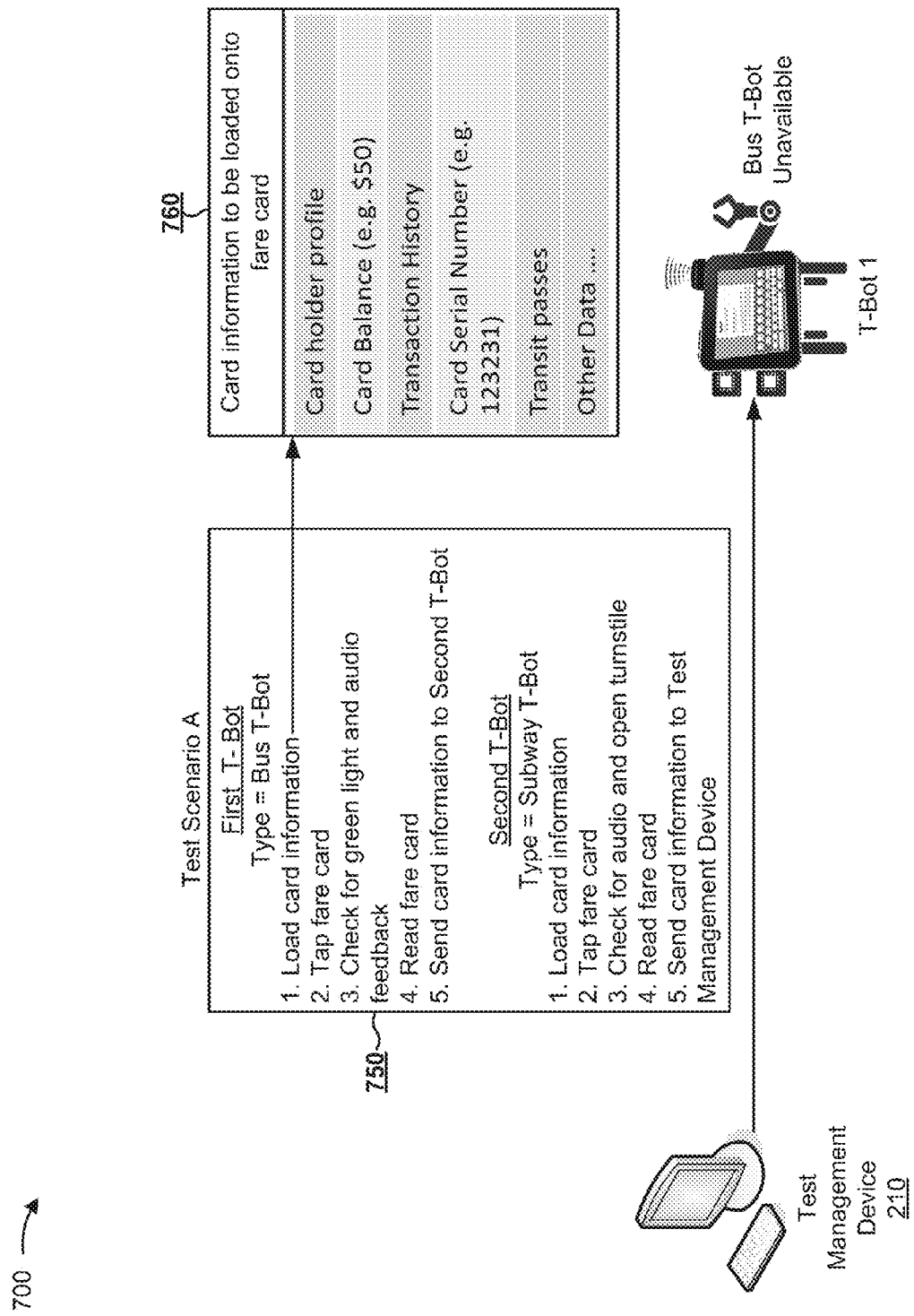

FIGS. 7A and 7B are diagrams of an example implementation 700 relating to example process 600 shown in FIG. 6. FIGS. 7A and 7B show an example of providing a test scenario to one or more test robots.

As shown in FIG. 7A, and by reference number 710, assume that test management device 210 receives an instruction to provide a test scenario, shown as Test Scenario A. Assume that Test Scenario A identifies a Bus test robot 220 (e.g., shown as a T-Bot) as a test robot type of a first test robot 220 to which Test Scenario A is to be provided. As shown by reference number 720, assume that test management device 210 broadcasts a request for a Bus T-Bot.

As shown by reference number 730, assume that T-Bot 1 is an available Bus T-Bot, T-Bot 2 is an available Subway T-Bot, and T-Bot 3 is an unavailable Bus T-Bot. Assume that all three of these test robots 220 receive the broadcast request. Assume that T-Bot 2 does not respond to the request because the request is for a Bus T-Bot and T-Bot 2 is a Subway T-Bot. Further, assume that T-Bot 3 does not respond to the request because T-Bot 3 is currently executing a test scenario or is powered down (e.g., is unavailable). As shown by reference number 740, assume that T-Bot 1 responds to the request, and indicates that T-Bot 1 is an available Bus T-Bot. Assume that test management device 210 receives the response from T-Bot 1.

As shown in FIG. 7B, and by reference number 750, assume that test management device 210 provides Test Scenario A to T-Bot 1 based on receiving the response from T-Bot 1. As shown, assume that Test Scenario A identifies that a first portion of the test scenario is to be executed by a Bus T-Bot, and that a second portion of the test scenario is to be executed by a Subway T-Bot. As further shown, assume that Test Scenario A identifies actions to be performed by each test robot 220. For example, assume that the Bus T-Bot is to load card information, identified in Test Scenario A, onto fare card 230, is to tap fare card 230 against card reader device 240, is to check for a green light and audio feedback provided by card reader device 240, is to read card information from fare card 230, and is to send the read card information to the Subway T-Bot. Assume that the Subway T-Bot is to load card information, received from the Bus T-Bot, onto fare card 230, is to tap fare card 230 against card reader device 240, is to check for audio feedback from card reader device 240 and an open turnstile, is to read card information from fare card 230, and is to send the read card information to test management device 210.

As shown by reference number 760, assume that test management device 210 provides card information, to T-Bot 1, to be loaded onto fare card 230. For example, assume that the card information identifies a profile of a card holder, a card balance (e.g., an amount of money to load onto fare card 230), a transaction history, a serial number, information associated with transit passes (e.g., to which the card holder is subscribed), etc. As further shown, assume that T-Bot 1 changes a status of T-Bot 1 to unavailable, since T-Bot 1 is currently executing a test scenario. Execution of Test Scenario A is described in more detail elsewhere herein in connection with FIGS. 9A-9C.

As indicated above, FIGS. 7A and 7B are provided merely as an example. Other examples are possible and may differ from what was described with regard to FIGS. 7A and 7B. For example, the card information may include a credential. Test robot 220 may read the credential and obtain the card information from a back end server device.

FIG. 8 is a flow chart of an example process 800 for executing a test scenario. In some implementations, one or more process blocks of FIG. 8 may be performed by test robot 220. In some implementations, one or more process blocks of FIG. 8 may be performed by another device or a group of devices separate from or including test robot 220, such as test management device 210, fare card 230, and/or card reader device 240.

As shown in FIG. 8, process 800 may include receiving a test scenario (block 810). For example, test robot 220 may receive a test scenario. As described in more detail elsewhere herein, test robot 220 may receive a request for an available test robot 220 of a particular test robot type, may determine that test robot 220 is available and is of the particular test robot type, may respond to the request, and may receive the test scenario based on responding to the request. In some implementations, test robot 220 may receive the test scenario from test management device 210. Additionally, or alternatively, test robot 220 may receive the test scenario from another test robot 220.

As further shown in FIG. 8, process 800 may include programming a fare card based on the test scenario (block 820). For example, test robot 220 may program fare card 230 based on the received test scenario. In some implementations, the test scenario may identify card information to be loaded onto fare card 230, and test robot 220 may load the identified card information onto fare card 230. For example, test robot 220 may load the card information onto fare card 230 by moving fare card 230 into communicative proximity of a card reader/writer component of test robot 220 (e.g., using an actuator arm, a robotic arm, etc.).

Card information may include, for example, an amount of money to be associated with fare card 230 (e.g., a card balance), a profile of a card holder to be associated with fare card 230, a transaction history to be associated with fare card 230, a serial number to be associated with fare card 230, transit pass information to be associated with fare card 230 (e.g., information that identifies transit passes to which the card holder is subscribed), etc. In other words, the card information may include the state of fare card 230 for the test scenario. Additionally, or alternatively, card information may include a credential. The credential may be used to access other card information (e.g., using a back end server device). In some implementations, updating card information may include updating card information stored by a back end server device rather than changing the credential stored by fare card 230.

As further shown in FIG. 8, process 800 may include interacting with a card reader device using the fare card (block 830). For example, test robot 220 may interact with card reader device 240 using fare card 230. In some implementations, test robot 220 may move fare card 230 into communicative proximity of card reader device 240 so that card reader device 240 can read card information from and/or write card information to fare card 230. For example, test robot 220 may use an actuator arm to move fare card 230 into communicative proximity of card reader device 240.

In some implementations, test robot 220 may interact with card reader device 240 (e.g., directly, via a back office server device, using information programmed on fare card 230, etc.) to program card reader device 240 with a test scenario. For example, test robot 220 may provide a script to card reader device 240, and card reader device 240 may execute the script to set a pre-condition for a test scenario, a post-condition for a test scenario, to trigger a particular action of card reader device 240 (e.g., to load money onto fare card 230, to issue a fine to fare card 230 that does not have a valid fare, etc.), or the like.

When test robot 220 moves fare card 230 into communicative proximity of card reader device 240, card reader device 240 may read card information from fare card 230, may update the card information (e.g., by adding money to the card balance, by removing money from the card balance, by updating a card holder profile, by updating a transaction history, by subscribing or unsubscribing the card holder from a transit pass, etc.), and may write the updated card information to fare card 230.

In some implementations, test robot 220 and/or test management device 210 may configure card reader device 240 by providing device configuration information to card reader device 240 (e.g., via network 250 and/or device configuration information stored by fare card 230). The device configuration information may include, for example, a location to be associated with card reader device 240, a vehicle identifier to be associated with card reader device 240 (e.g., a bus number, a train number, etc.), one or more fare rules for card reader device 240, information that identifies a back office server device to which card reader device 240 connects to, HMI behavior of card reader device 240, or the like. Card reader device 240 may use the device configuration information to control a manner in which card information, stored by fare card 230, is updated by card reader device 240. Additionally, or alternatively, card reader device 240 may use the device configuration information to control HMI behavior, a manner in which transaction messages are created, a back office server device to which card reader device 240 connects, or the like.

As further shown in FIG. 8, process 800 may include detecting feedback provided by the card reader device (block 840). For example, when test robot 220 moves fare card 230 into communicative proximity of card reader device 240, card reader device 240 may provide detectable feedback. Test robot 220 may monitor card reader device 240 (or an environment in which card reader device 240 is located) for feedback. In some implementations, test robot 220 may monitor for feedback by detecting that an action was performed by card reader device 240, such as emitting a light, emitting a sound, moving an object (e.g., opening a turnstile), changing a message or graphic displayed on a display, etc. Additionally, or alternatively, test robot 220 may monitor for feedback by detecting that an action (e.g., an expected action) was not performed by card reader device 240 (e.g., a light was not emitted, a sound was not emitted, an object was not moved, a turnstile was not opened, a message or graphic was not displayed, etc.). In some implementations, test robot 220 may record the monitored feedback (e.g., as test result information).

As further shown in FIG. 8, process 800 may include reading card information from the fare card (block 850). For example, test robot 220 may read card information from fare card 230, which may have been updated by card reader device 240. Additionally, or alternatively, test robot 220 may read a credential from fare card 230, and may use the credential to obtain the card information (e.g., from a back end server device). In some implementations, test robot 220 may record the card information (e.g., as test result information). Additionally, or alternatively, test robot 220 may determine whether the card information changed based on an interaction between fare card 230 and card reader device 240 (e.g., by comparing card information that test robot 220 used to program fare card 230 and card information read after an attempted interaction with card reader device 240, by comparing card information read after an attempted interaction with card reader device 240 and expected card information specified as part of the test step in the test scenario, etc.). Test robot 220 may record (e.g., as test result information) information that identifies whether the card information changed based on an interaction (or an attempted interaction) between fare card 230 and card reader device 240.

As further shown in FIG. 8, process 800 may include determining whether the test scenario is to be sent to another test robot (block 860). For example, test robot 220 may determine whether the test scenario is to be sent to another test robot 220 (e.g., with or without assistance from test management device 210), as described elsewhere herein in connection with FIG. 6. In some implementations, test robot 220 may provide card information (e.g., read by test robot 220 after interacting with card reader device 240) to test management device 210, and test management device 210 may determine whether the test scenario is to be sent to another test robot 220, as described elsewhere herein in connection with FIG. 6.

As further shown in FIG. 8, if the test scenario is to be sent to another test robot (block 860—YES), then process 800 may include providing the card information and/or the test scenario to another test robot (block 870). For example, if test robot 220 determines that the test scenario is to be sent to another test robot 220, then test robot 220 may provide the test scenario to the other test robot 220, as described elsewhere herein in connection with FIG. 6. Additionally, or alternatively, test robot 220 may provide card information, read by test robot 220 (e.g., after interacting with card reader device 240), to the other test robot 220. In this way, the other test robot 220 may use the card information to continue executing the test scenario.

As further shown in FIG. 8, if the test scenario is not to be sent to another test robot (block 860—NO), then process 800 may include providing the card information and/or the test result information to a test management device (block 880). For example, if test robot 220 determines that the test scenario is not to be sent to another test robot 220, then test robot 220 may provide card information (e.g., read by test robot 220 after interacting with card reader device 240) to test management device 210. Additionally, or alternatively, test robot 220 may provide test result information to test management device 210, as described elsewhere herein in connection with FIG. 6. In this way, one or more test robots 220 may executed a test scenario, may analyze test result information (e.g., to determine whether the test scenario passed or failed), and/or may provide test result information to test management device 210 for analysis.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
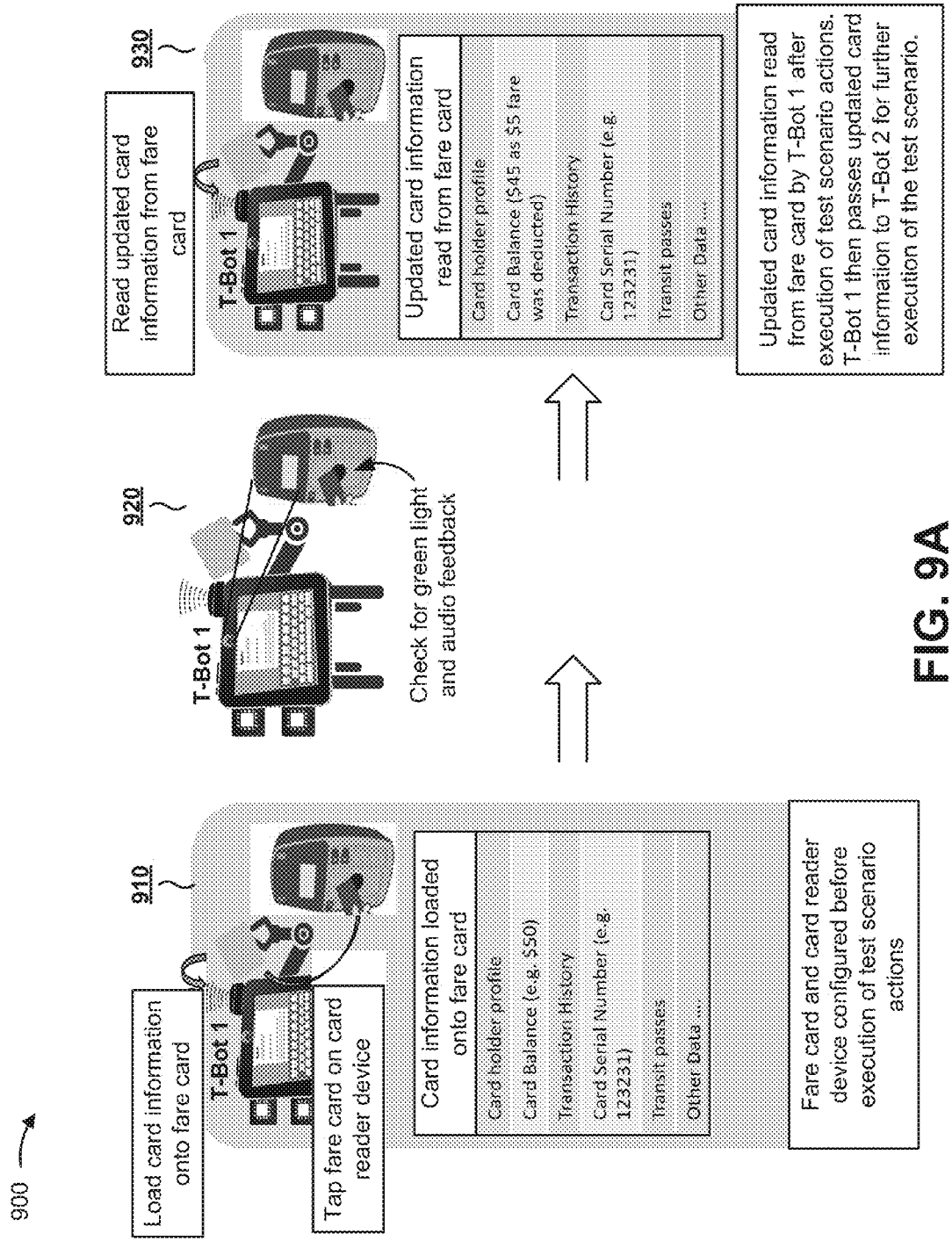
FIGS. 9A-9C are diagrams of an example implementation relating to the example process shown in FIG. 8.
Figure 9B:
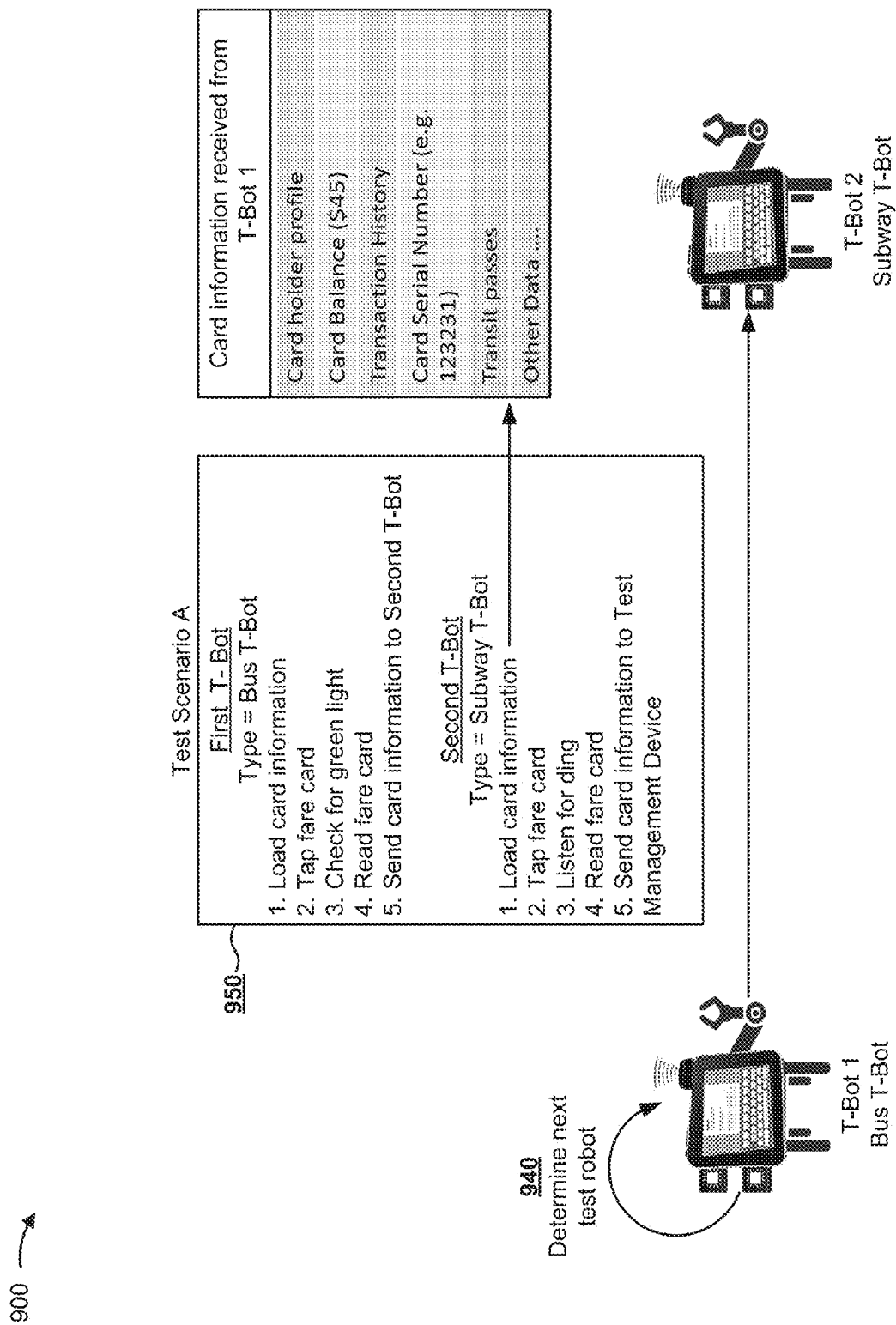
Figure 9C:
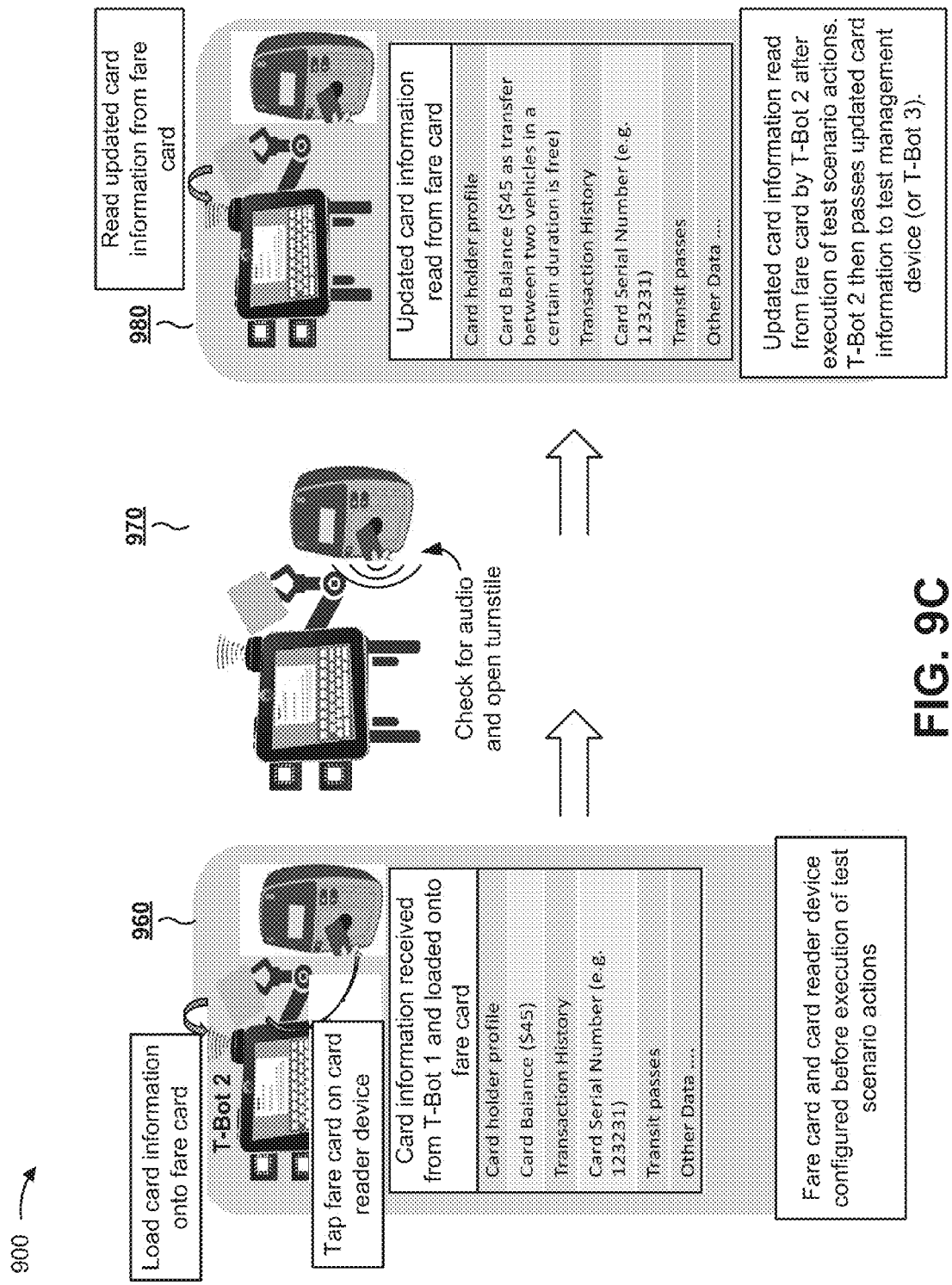

FIGS. 9A-9C are diagrams of an example implementation 900 relating to example process 800 shown in FIG. 8. FIGS. 9A-9C show an example of executing a test scenario.

As shown in FIG. 9A, and by reference number 910, assume that after receiving Test Scenario A that identifies card information to be loaded onto fare card 230, T-Bot 1 uses an actuator arm to move fare card 230 within communicative proximity of a card reader/writer component of T-Bot 1. Once within communicative proximity, assume that T-Bot 1 provides the card information to fare card 230 for storage by fare card 230. Assume that the card information includes information described herein in connection with FIG. 7B, including an initial card balance of $50. As further shown, assume that T-Bot 1 moves fare card 230 within communicative proximity of card reader device 240, which corresponds to a card reader device 240 associated with collecting bus fare (e.g., since, in this example, T-Bot 1 is a Bus T-Bot).

As shown by reference number 920, assume that T-Bot 1 monitors card reader device 240 for a green light and audio feedback (e.g., based on information included in Test Scenario A). Assume that T-Bot 1 detects the green light and the audio feedback. Thus, assume that card reader device 240 successfully read card information from fare card 230, and wrote updated card information to fare card 230. In this example, assume that card reader device 240 deducted $5 from fare card 230 (e.g., for bus fare), and replaced the card balance of $50 with a card balance of $45. As shown by reference number 930, assume that T-Bot 1 reads the updated card information, including the updated card balance of $45.

Additionally, or alternatively, T-Bot 1 may validate a transaction message generated by card reader device 240 based on an interaction between fare card 230 and card reader device 240. T-Bot 1 may validate the transaction message as the transaction message flows through one or more devices of a back end system, and may validate responses and/or actions performed by different devices or components of the back end system (e.g., in response to receiving the transaction message).

As shown in FIG. 9B, and by reference number 940, assume that T-Bot 1 determines that T-Bot 2 is a next test robot 220 in a set of test robots 220 to execute Test Scenario A. In some implementations, T-Bot 1 may identify T-Bot 2 (e.g., using a network address of T-Bot 2) based on information received from test management device 210. Additionally, or alternatively, T-Bot 1 may identify T-Bot 2 by sending a request for an available subway test robot 220 (e.g., identified in Test Scenario A), and may receive a response from T-Bot 2. Additionally, or alternatively, T-Bot 1 may send a request for an available subway T-Bot, and one or more subway T-Bots may respond with their earliest available time. T-Bot 1 may select a subway T-Bot with the earliest available time. As shown by reference number 950, assume that T-Bot 1 transmits Test Scenario A to T-Bot 2. Further, assume that T-Bot 1 transmits the updated card information to T-Bot 2, including information that identifies the updated card balance of $45.

As shown in FIG. 9C, and by reference number 960, assume that T-Bot 2 receives Test Scenario A from T-Bot 1, and that T-Bot 2 uses an actuator arm to move fare card 230 within communicative proximity of a card reader/writer component of T-Bot 2. Once within communicative proximity, assume that T-Bot 2 provides the updated card information to fare card 230 for storage by fare card 230. Assume that the updated card information includes information that identifies an updated card balance of $45. As further shown, assume that T-Bot 2 moves fare card 230 within communicative proximity of card reader device 240, which corresponds to a card reader device 240 associated with collecting subway fares (e.g., since, in this example, T-Bot 2 is a Subway T-Bot).

As shown by reference number 970, assume that T-Bot 2 monitors card reader device 240 for audio feedback and an open turnstile (e.g., based on information included in Test Scenario A). Assume that T-Bot 2 detects the audio and the open turnstile. Thus, assume that card reader device 240 successfully read card information from fare card 230. In this example, assume that the subway card reader device 240 determines that bus fare was deducted within a threshold amount of time from when fare card 230 interacted with subway card reader device 240, and does not deduct any subway fare from fare card 230. For example, assume that Test Scenario A is designed to test the scenario where a card holder transfers from a bus to a subway. As shown by reference number 980, assume that T-Bot 2 reads the card information (e.g., which may be updated by card reader device 240 to indicate the free transfer), determines that there are no more test robots 220 in Test Scenario A, and provides test result information, including the card information, to test management device 210.

Additionally, or alternatively, T-Bot 2 may validate a transaction message generated by card reader device 240 based on an interaction between fare card 230 and card reader device 240. T-Bot 2 may validate the transaction message as the transaction message flows through one or more devices of a back end system, and may validate responses and/or actions performed by different devices or components of the back end system (e.g., in response to receiving the transaction message). T-Bot 2 may determine test result information based on validating the transaction message (e.g., an indication of whether the transaction message was correctly generated, an indication of whether a back end device performed a correct action based on the transaction message, etc.), and may provide the test result information to test management device 210. In this way, test management device 210 may determine whether Test Scenario A executed successfully, based on an amount of time between interactions and a card balance.

As indicated above, FIGS. 9A-9C are provided merely as an example. Other examples are possible and may differ from what was described with regard to FIGS. 9A-9C.

Figure 10:
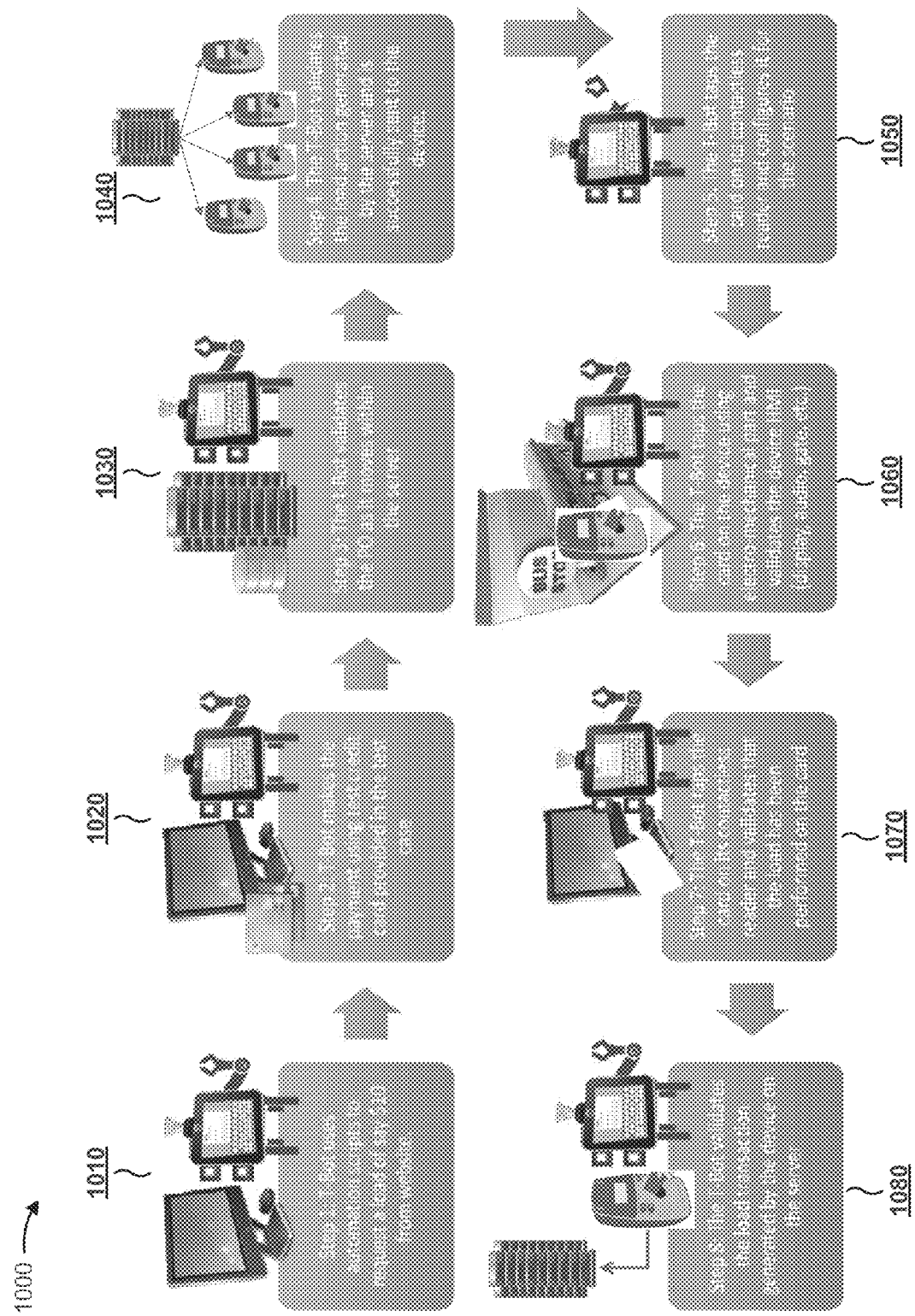
FIG. 10 is a diagram of another example implementation relating to the example process shown in FIG. 8.

FIG. 10 is a diagram of another example implementation 1000 relating to example process 800 shown in FIG. 8. FIG. 10 shows another example of executing a test scenario.

As shown in FIG. 10, assume that test robot 220 receives a test scenario to test the loading of money onto fare card 230 via a website (e.g., using credit card information). As shown by reference number 1010, assume that test robot 220 executes one or more scripts to request to load $10 onto fare card 230. For example, test robot 220 may provide information to a web server to request the $10 load. As shown by reference number 1020, assume that test robot 220 further interacts with the web server to make a payment (e.g., a simulated payment) using a test credit card identified in the test scenario.

As shown by reference number 1030, assume that test robot 220 communicates with one or more network devices (e.g., a web server, a payment server, a back office server device, etc.) to validate a transaction message associated with the fare purchase order. As shown by reference number 1040, assume that test robot 220 validates that the load action, indicating that $10 is to be loaded onto fare card 230, has been successfully provided to one or more card reader devices 240 based on the transaction message (e.g., so that the $10 can be loaded onto fare card 230 when fare card 230 is within communicative proximity of card reader device 240).

As shown by reference number 1050, assume that test robot 220 taps fare card 230 to a card reader/writer component of test robot 220 to configured fare card 230 for the test scenario (e.g., to load a card holder profile associated with the $10 load action). As shown by reference number 1060, assume that test robot 220 moves fare card 230 within communicative proximity of card reader device 240, which has previously received the load action. Further, assume that test robot 220 monitors feedback from card reader device 240.

As shown by reference number 1070, assume that test robot 220 again moves fare card 230 within communicative proximity of a card reader/writer component of test robot 220. In this case, assume that test robot 220 validates that the $10 has been loaded onto fare card 230 by card reader device 240. As shown by reference number 1080, assume that test robot 220 also validates that the load action has been recorded by the one or more server devices (e.g., a payment server) based on a transaction message. Additionally, or alternatively, test robot 220 may provide test result information to test management device 210 to validate that the test scenario was successfully performed. Thus, as shown in FIG. 10, a test scenario may involve a single test robot 220, or may involve multiple test robots 220, as described elsewhere herein.

As indicated above, FIG. 10 is provided merely as an example. Other examples are possible and may differ from what was described with regard to FIG. 10.

Figure 11:
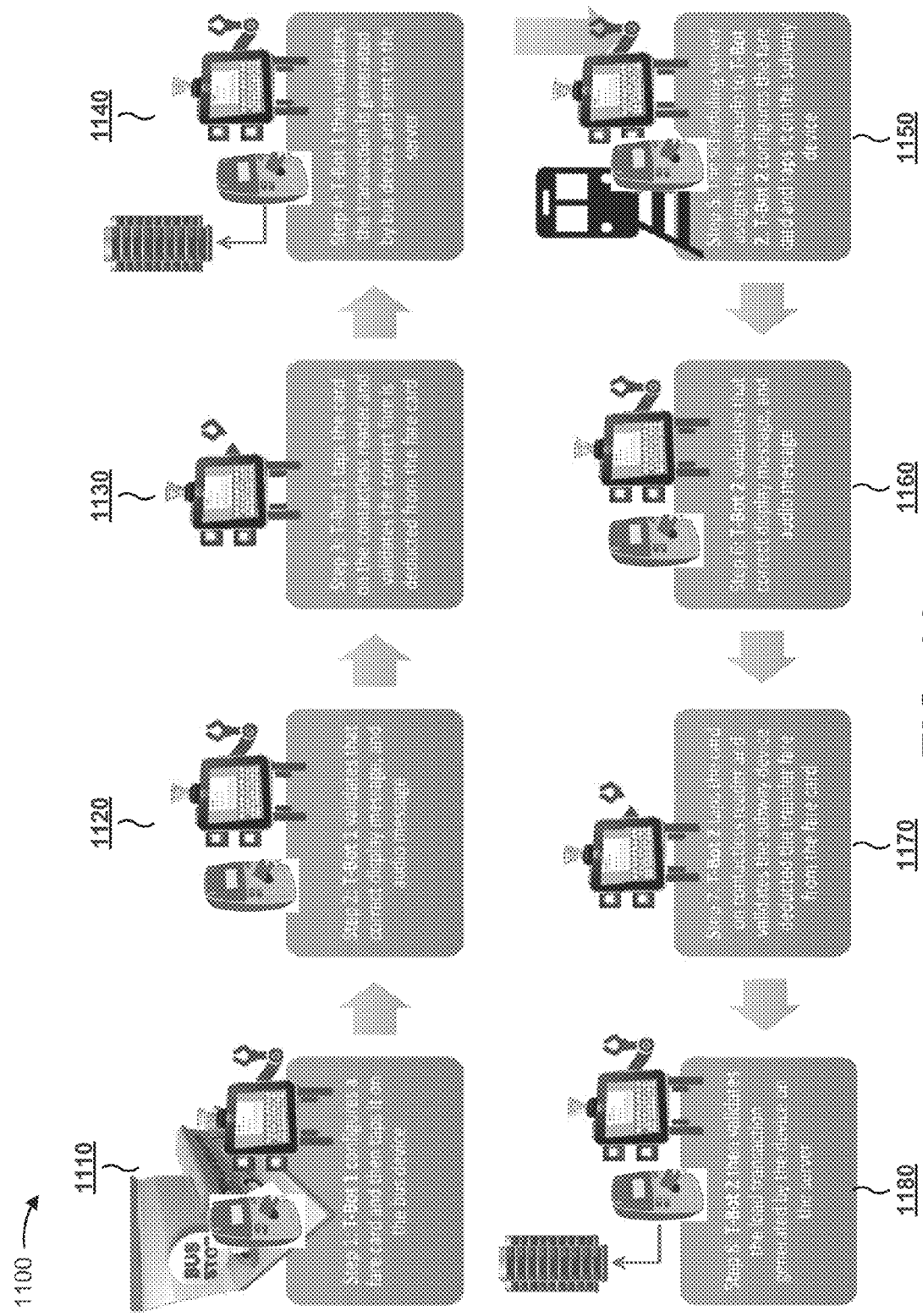
FIG. 11 is a diagram of another example implementation relating to the example process shown in FIG. 8.

FIG. 11 is a diagram of another example implementation 1100 relating to example process 800 shown in FIG. 8. FIG. 11 shows another example of executing a test scenario.

As shown in FIG. 11, assume that a first test robot 220, shown as T-Bot 1, receives a test scenario to test the deduction of proper fare amounts from fare card 230. As shown by reference number 1110, assume that T-Bot 1 configures fare card 230 (e.g., by tapping fare card 230 on a card reader/writer component associated with T-Bot 1), and then taps fare card 230 on a bus card reader device 240 configured to collect bus fare (e.g., moves fare card 230 within communicative proximity of bus card reader device 240). As shown by reference number 1120, assume that T-Bot 1 validates that bus card reader device 240 displays the correct visual message, and emits the correct audio message.

As shown by reference number 1130, assume that T-Bot 1 taps fare card 230 on a card reader/writer component associated with T-Bot 1 to read fare card 230, and validates that bus card reader device 240 deducted the correct fare from fare card 230. As shown by reference number 1140, assume that T-Bot 1 communicates with a server device (e.g., a transaction server) to validate that a transaction message was correctly generated by bus card reader device 240 and transmitted to the server device.

As shown by reference number 1150, assume that test management device 210 (e.g., a scheduling server) assigns the test scenario to a second test robot 220, shown as T-Bot 2. As another example, T-Bot 1 may assign the test scenario to T-Bot 2. Assume that test management device 210 and/or T-Bot 1 provide the card information, stored by fare card 230 after interaction with bus card reader device 240, to T-Bot 2. Assume that T-Bot 2 configures fare card 230 with the card information, and then taps fare card 230 on a subway card reader device 240 configured to collect subway fare. As shown by reference number 1160, assume that T-Bot 2 validates that subway card reader device 240 displays the correct visual message, and emits the correct audio message.

As shown by reference number 1170, assume that T-Bot 2 taps fare card 230 on a card reader/writer component associated with T-Bot 2 to read fare card 230, and validates that subway card reader device 240 deducted the correct fare from fare card 230. As shown by reference number 1180, assume that T-Bot 2 communicates with a server device (e.g., a transaction server) to validate that a transaction message was correctly generated by subway card reader device 240 and transmitted to the server device. Additionally, or alternatively, test robot 220 may provide test result information to test management device 210 to validate that the test scenario was successfully performed.

As indicated above, FIG. 11 is provided merely as an example. Other examples are possible and may differ from what was described with regard to FIG. 11.

Implementations described herein assist in automating the testing of automated fare management systems, which may reduce the amount of time required to perform the tests and may increase the accuracy of test results.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A test robot, comprising:
   one or more processors to:
   provide an indication that the test robot is available to receive a test scenario;
   receive the test scenario for testing a payment management system based on sending the indication;
   program a payment card to store card information based on the test scenario;
   provide an instruction to a motor that causes the motor to move the payment card within communicative proximity of a card reader device,
   the payment card, when moved within communicative proximity of the card reader device, causing the card reader device to read the card information from the payment card and to provide updated card information, based on the card information, for storage by the payment card;
   read the updated card information from the payment card; and
   provide the updated card information to another device.

2. The test robot of claim 1, where the one or more processors are further to:
   receive a request for a particular test robot type;
   determine that the test robot is of the particular test robot type;
   where the one or more processors, when providing the indication, are to:
   respond to the request for the particular test robot type by providing the indication based on determining that the test robot is of the particular test robot type.

3. The test robot of claim 1, where the one or more processors, when programming the payment card to store the card information, are to:
   receive the card information;
   instruct an actuator component to move the payment card within communicative proximity of a card reader/writer component of the test robot,
   the card reader/writer component being different from the card reader device; and
   transmit the card information to the payment card via the card reader/writer component based on instructing the actuator component to move the payment card within communicative proximity of the card reader/writer component of the test robot.

4. The test robot of claim 1, where the one or more processors, when receiving the test scenario, are to:
   receive the test scenario, including configuration information for configuring the card reader device, from a test management device; and
   where the one or more processors are further to:
   provide the configuration information to the card reader device to configure the card reader device based on the test scenario.

5. The test robot of claim 1, where the one or more processors, when receiving the test scenario, are to:
   receive the test scenario from another test robot that is different from the test robot.

6. The test robot of claim 1, where the one or more processors are further to:

provide the test scenario and the updated card information to another test robot for further execution of the test scenario, by the other test robot, using the updated card information.

7. A non-transitory computer-readable medium storing instructions, the instructions comprising:
one or more instructions that, when executed by one or more processors, cause the one or more processors to:
receive a test scenario for testing a payment management system,
the test scenario including card information to be stored by a payment card;
program the payment card, based on the test scenario, to cause the payment card to store the card information;
instruct a motor to move the payment card within communicative proximity of a card reader device,
the payment card, when moved within communicative proximity of the card reader device, causing the card reader device to read the card information from the payment card and to provide updated card information, based on the card information, for storage by the payment card;
instruct the motor to move the payment card within communicative proximity of a card reader/writer component,
the card reader/writer component being different from the card reader device;
read the updated card information from the payment card via the card reader/writer component after instructing the motor to move the payment card within communicative proximity of the card reader/writer component; and
provide the updated card information to another device.

8. The non-transitory computer-readable medium of claim 7, where the one or more instructions, when executed by the one or more processors, further cause the one or more processors to:
monitor for feedback from the card reader device after instructing the motor to move the payment card within communicative proximity of the card reader device;
record test result information based on monitoring for the feedback,
the test result information indicating a result of monitoring for the feedback; and
provide the test result information to the other device.

9. The non-transitory computer-readable medium of claim 8, where the one or more instructions, that cause the one or more processors to monitor for feedback, cause the one or more processors to:
monitor for visual or audible feedback from the card reader device; and
where the one or more instructions, that cause the one or more processors to record the test result information, cause the one or more processors to:
record, as the test result information, an indication of whether the visual or audible feedback was detected.

10. The non-transitory computer-readable medium of claim 8, where the one or more instructions, that cause the one or more processors to monitor for feedback, cause the one or more processors to:
determine whether an expected action, identified by the test scenario, was performed by the card reader device; and
where the one or more instructions, that cause the one or more processors to record the test result information, cause the one or more processors to:
record, as the test result information, an indication of whether the expected action was performed.

11. The non-transitory computer-readable medium of claim 8, where the one or more instructions, that cause the one or more processors to monitor for feedback, cause the one or more processors to:
determine whether an object, associated with the card reader device, moved; and
where the one or more instructions, that cause the one or more processors to record the test result information, cause the one or more processors to:
record, as the test result information, an indication of whether the object moved.

12. The non-transitory computer-readable medium of claim 8, where the one or more instructions, that cause the one or more processors to monitor for feedback, cause the one or more processors to:
determine whether a transaction message was provided to a back end device;
validate whether an action was performed by the back end device based on the transaction message; and
where the one or more instructions, that cause the one or more processors to record the test result information, cause the one or more processors to:
record, as the test result information, an indication of whether the transaction message was provided to the back end device or whether the action was performed by the back end device.

13. The non-transitory computer-readable medium of claim 7, where the one or more instructions, that cause the one or more processors to provide the updated card information to another device, cause the one or more processors to:
provide the updated card information to a test robot.

14. A method, comprising:
receiving, by a device, a test scenario for testing a payment management system,
the test scenario indicating a particular type of test robot;
providing, by the device, the test scenario to a first test robot of the particular type of test robot;
receiving, by the device, test result information associated with execution of the test scenario by the first test robot;
determining, by the device, whether the test scenario is to be provided to a second test robot for further execution; and
selectively causing, by the device, the test scenario to be provided to the second test robot based on determining whether the test scenario is to be provided to the second test robot.

15. The method of claim 14, where determining whether the test scenario is to be provided to the second test robot comprises:
determining, based on the test scenario, that the test scenario is to be provided to the second test robot for further execution; and
where selectively causing the test scenario to be provided to the second test robot comprises:
providing the test scenario to the second test robot.

16. The method of claim 14, where selectively causing the test scenario to be provided to the second test robot comprises:
providing an instruction, to the first test robot, to cause the first test robot to provide the test scenario to the second test robot.

17. The method of claim 14, where the test scenario includes card information to be stored by a payment card and to be used to test the payment management system; and
where the method further comprises:
provide the card information to the first test robot, the card information causing the first test robot to program the payment card to store the card information; and
where receiving the test result information comprises:
receiving updated card information read by the first test robot based on an interaction between the first test robot and a card reader device that provides the updated card information for storage by the payment card.

18. The method of claim 14, where providing the test scenario to the first test robot comprises:
providing the test scenario to the first test robot for execution of a first portion of the test scenario, the test scenario causing the first test robot to execute the first portion of the test scenario; and
where selectively causing the test scenario to be provided to the second test robot comprises:
providing the test scenario to the second test robot for execution of a second portion of the test scenario, the test scenario causing the second test robot to execute the second portion of the test scenario, the second portion being different than the first portion.

19. The method of claim 14, further comprising:
outputting a request for the particular type of test robot identified by the test scenario;
receiving, from the first test robot of the particular type of test robot, a response to the request;
where providing the test scenario to the first test robot includes providing the test scenario to the first test robot based on receiving the response.

20. The method of claim 14, where the test scenario identifies an amount of time to wait before providing the test scenario to the second test robot, and
where selectively causing the test scenario to be provided to the second test robot includes causing the test scenario to be provided to the second test robot after waiting the amount of time.

\* \* \* \* \*